US012560697B2

(12) United States Patent
Sasaki

(10) Patent No.: US 12,560,697 B2
(45) Date of Patent: Feb. 24, 2026

(54) INFORMATION PROCESSING DEVICE, AND INFORMATION PROCESSING METHOD

(71) Applicant: Sony Semiconductor Solutions Corporation, Kanagawa (JP)

(72) Inventor: Ryo Sasaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 342 days.

(21) Appl. No.: 18/552,791

(22) PCT Filed: Dec. 9, 2022

(86) PCT No.: PCT/JP2022/045390
§ 371 (c)(1),
(2) Date: Sep. 27, 2023

(87) PCT Pub. No.: WO2023/149076
PCT Pub. Date: Aug. 10, 2023

(65) Prior Publication Data
US 2024/0168152 A1 May 23, 2024

(30) Foreign Application Priority Data
Feb. 3, 2022 (JP) ................................. 2022-015386

(51) Int. Cl.
*G01S 13/60* (2006.01)
*G01S 13/00* (2006.01)
*H04B 7/0413* (2017.01)
(52) U.S. Cl.
CPC ............ *G01S 13/60* (2013.01); *G01S 13/003* (2013.01); *H04B 7/0413* (2013.01)

(58) Field of Classification Search
CPC .................................................... H04B 7/0413
See application file for complete search history.

(56) References Cited

U.S. PATENT DOCUMENTS

2022/0099820 A1* 3/2022 Hong ...................... G01S 7/354

FOREIGN PATENT DOCUMENTS

JP 2019-522220 A 8/2019
JP 2020-148745 A 9/2020
(Continued)

OTHER PUBLICATIONS

International Search Report (PCT/ISA/210), International Application No. PCT/JP2022/045390, dated Jan. 31, 2023.

*Primary Examiner* — Vladimir Magloire
*Assistant Examiner* — Eric K Hodac
(74) *Attorney, Agent, or Firm* — Michael Best & Friedrich LLP

(57) ABSTRACT
To obtain a speed expansion range.
A speed detection apparatus includes: a transmission antenna array that transmits a plurality of chirp signals multiplexed between a plurality of transmission antennas arranged in a vertical direction; a reception antenna array that includes a plurality of reception antennas receiving the plurality of chirp signals that has been reflected; and a speed determination unit that calculates a plurality of speed candidates on the basis of the plurality of chirp signals received by the reception antenna array, determines whether or not a plurality of vertical arrival angle estimation values corresponding to the plurality of speed candidates falls within a vertical angle threshold range, and determines, as a true speed, one speed candidate from the plurality of speed candidates on the basis of a determination result.

18 Claims, 25 Drawing Sheets

(56)         References Cited

FOREIGN PATENT DOCUMENTS

| JP | 2021-039057 | A | 3/2021 |
| JP | 2021-152531 | A | 9/2021 |

* cited by examiner (A)

(B)

FoV with arraying

FoV without arraying

| Nant=3 | |
| --- | --- |
| Nwrap | Δ φ |
| -4 | -41.8103 |
| -2 | 41.81031 |
| -3 | 0 |
| -2 | 41.81031 |
| -1 | -41.8103 |
| 0 | 0 |
| 1 | 41.81031 |
| 2 | -41.8103 |
| 3 | 0 |
| 4 | 41.81031 |

| Nant=4 | |
| --- | --- |
| Nwrap | Δ φ |
| -4 | 0 |
| -2 | -90 |
| -3 | 30 |
| -2 | -90 |
| -1 | -30 |
| 0 | 0 |
| 1 | 30 |
| 2 | -90 |
| 3 | -30 |
| 4 | 0 |

FIG.18 t

θElevr

Center line of radar

INFORMATION PROCESSING DEVICE, AND INFORMATION PROCESSING METHOD

TECHNICAL FIELD

The present disclosure relates to a speed detection apparatus, an information processing device, and an information processing method that use a frequency modulated continuous wave (FMCW) radar.

BACKGROUND ART

In a multi input multi output (MIMO) radar, a plurality of transmission antennas transmits chirp signals in groups called bursts. A reception antenna receives the reflected chirp signal. The received signal is downconverted, digitized, and then processed to obtain distances, speeds, and arrival angles of a plurality of objects in front of the radar. The chirp signal is a signal whose frequency varies linearly over time. Time division multiplexing (TDM), binary phase multiplexing (BPM), and the like are known as methods of ensuring orthogonality of signals transmitted from the plurality of transmission antennas.

CITATION LIST

Patent Literature

Patent Literature 1: Japanese Unexamined Patent Application Publication No. 2019-522220

DISCLOSURE OF INVENTION

Technical Problem

A speed detection range (referred to also as an observable speed) in which a radar detects a speed is limited. The MIMO radar has a characteristic of a low observable speed. In the case where a target with a speed exceeding the observable speed is detected, it is detected as a false speed instead of being invisible because it is out of the observable speed. Due to the detection of a false speed, problems such as occurrence of ghosts, misrecognition, reduction in electric power, and misdetection of arrival angles occur in some cases. The observable speed of the radar is obtained by the following formula.

$$V\text{max}=\lambda/(4\times TB)[\text{m/s}]$$

Vmax is the maximum value of the observable speed, $\lambda$ is the wavelength, and TB is the burst interval between chirps for calculating the speed. Since the burst interval TB is defined as the interval between chirp signals from the same antenna, the burst intervals T is represented by $N\times Tc$ in the MIMO radar in which chirps are applied from a plurality of transmission antennas in time division or phase division, and the formula described above is further represented as follows.

$$V\text{max}=\lambda/(4\times N\times Tc)[\text{m/s}]$$

N is the number of the plurality of transmission antennas and Tc is an interval between chirp signals. As is clear from this formula, TB increases and Vmax decrease as N increases. This is the reason why the observable speed is low in the MIMO.

In this regard, as one method of expanding the speed detection range, a method using an angle of arrival (AoA) is known as shown in Patent Literature 1. The metho using AoA utilizes the reduction in electric power due to a directivity deviation (false speed) caused by a speed phase difference between transmission antennas in the MIMO. MIMO speed phase correction and AoA are performed on the plurality of possible speeds, and a speed candidate with larger electric power is used as a true speed.

By expanding the speed, there are advantages that the true speed can be detected even if the speed wraps and reduction in electric power, occurrence of ghosts, misdetection, and the like can be prevented by knowing the true speed.

However, the speed expansion means disclosed in Patent Literature 1 has a problem that it cannot be applied to arrival angle estimation in the vertical direction.

In order to perform arrival angle estimation in the vertical direction, it is necessary to arrange transmission antennas in the vertical direction and multiple and transmit chirps for each transmission antenna. At this time, if the linearity of the phase difference due to the height between transmission antennas and the linearity of the phase difference due to the speed difference between multiplexed chirps match, it is difficult to analyze the result of arrival angle estimation by the method disclosed in Patent Literature 1. This is because the spectrum in which the peak power in the height estimation result for each speed wrap is almost the same and only the arrival angle differs is obtained.

In view of the circumstances as described above, it is desired to make the speed expansion means applicable also to the case of estimating an arrival angle in the vertical direction.

Solution to Problem

A speed detection apparatus according to an embodiment of the present disclosure includes:

a transmission antenna array that transmits a plurality of chirp signals multiplexed between a plurality of transmission antennas arranged in a vertical direction;

a reception antenna array that includes a plurality of reception antennas receiving the plurality of chirp signals that has been reflected; and a speed determination unit that calculates a plurality of speed candidates on the basis of the plurality of chirp signals received by the reception antenna array, and determines whether or not a plurality of vertical arrival angle estimation values corresponding to the plurality of speed candidates falls within a vertical angle threshold range, and determines, as a true speed, one speed candidate from the plurality of speed candidates on the basis of a determination result.

In accordance with this embodiment, the plurality of vertical arrival angle estimation values corresponding to the plurality of speed candidates that is the result of the speed expansion differs, one true vertical arrival angle is determined from the plurality of vertical arrival angle estimation values, and the speed corresponding to the vertical arrival angle can be determined as a true speed. By this method, it is possible to widely expand the observable speed.

The speed determination unit may determine, as the true speed, one speed candidate corresponding to one vertical arrival angle estimation value included in the vertical angle threshold range.

In accordance with this embodiment, a vertical arrival angle having the peak in the vertical angle threshold range is determined as a true vertical arrival angle, and the speed corresponding to the vertical arrival angle can be determined as a true speed.

The speed determination unit may determine, as a true vertical arrival angle, one vertical arrival angle estimation value included in the vertical angle threshold range.

In accordance with this embodiment, a vertical arrival angle having the peak in the vertical angle threshold range can be determined as a true vertical arrival angle.

The speed determination unit may dynamically calculate the vertical angle threshold range on the basis of the number of and intervals between the plurality of transmission antennas that transmits the plurality of chirp signals.

By dynamically changing the vertical angle threshold range, it is possible to specify one vertical arrival angle estimation value included in the vertical angle threshold range and determines the speed candidate corresponding to this value as a true speed.

The speed determination unit may dynamically calculate the vertical angle threshold range on the basis of a distance from the transmission antenna array.

As described above in the in-vehicle radar, the vertical angle threshold range in the vertical direction (height direction) of the antenna can be narrowed down. This is because it is not necessary to have sensitivity in the ground direction and the sky direction (it is desired to reduce the sensitivity to the reflection from the ground). In other words, in the in-vehicle radar that should detect a forward vehicle or the like, a target such as a forward vehicle cannot be present under the ground or in the sky. For this reason, in the in-vehicle radar, there is little need to consider the height in the negative direction particularly for long distances. Therefore, it is possible to further limit the vertical angle threshold range in the negative direction (direction toward the underground) to a narrower range.

The speed determination unit may dynamically calculate the vertical angle threshold range on a basis of a table in which a plurality of vertical angle threshold ranges is registered corresponding to a plurality of distances from the transmission antenna array.

As a result, it is possible to easily and reliably determine an appropriate vertical angle threshold range in accordance with the distance.

The speed determination unit may set a vertical angle threshold range with a value within a range that satisfies the following formula of Math. 10.

As a result, it is possible to easily and reliably determine an appropriate vertical angle threshold range in accordance with the distance.

The speed determination unit may dynamically calculate the vertical angle threshold range on a basis of a mounting height of the speed detection apparatus in the vertical direction.

By dynamically calculating a vertical angle threshold range on the basis of a mounting height of the speed detection apparatus in the vertical direction, it is possible to determine a vertical angle threshold range more appropriately.

The speed determination unit may set a vertical angle threshold range with a value within a range that satisfies the following formula of Math. 11.

By dynamically calculating a vertical angle threshold range on the basis of not only the mounting height of the speed detection apparatus in the vertical direction and the mounting angle error, it is possible to determine a vertical angle threshold range more and more appropriately.

The speed detection apparatus may further include a chirp control unit that controls the plurality of chirp signals transmitted from the plurality of transmission antennas such that when the plurality of chirp signals multiplexed between the plurality of transmission antennas is separated for each of the plurality of transmission antennas, intervals between the plurality of chirp signals from the same transmission antenna are equal and a plurality of intervals between the plurality of chirp signals from different transmission antennas are substantially equal.

In accordance with this embodiment, although when the plurality of chirp signals multiplexed between the plurality of transmission antennas is separated for each of the plurality of transmission antennas, intervals between the plurality of chirp signals from the same transmission antenna are equal and a plurality of intervals between the plurality of chirp signals from different transmission antennas are substantially equal, it is possible to expand the speed detection range even in the case of performing arrival angle estimation in the vertical direction.

The chirp control unit may multiplex the plurality of chirp signals between the plurality of transmission antennas in time division.

The chirp control unit may multiplex the plurality of chirp signals between the plurality of transmission antennas in phase division.

This embodiment is appliable to both the time division MIMO and the phase division MIMO.

One speed may be determined from the plurality of speed candidates, the number of the plurality of speed candidates being equal to or less than the number of the plurality of transmission antennas that transmits the plurality of chirp signals to be used for vertical arrival angle estimation.

This embodiment is capable of expanding the speed range by the amount corresponding to the number of transmission antennas. The observable speed that is originally narrowed by the amount corresponding to the number of transmission antennas can be recovered by the amount corresponding the number of transmission antennas.

The transmission antenna array and the reception antenna array may constitute a vertical MIMO array with substantially equal intervals.

Typically, since the intervals for transmitting chirp signals are equal intervals, the phase difference of the speed and the phase difference of the height cannot be distinguished from each other because the phase difference of the speed and the phase difference of the height have the same linearity even in the case of trying to expand the speed by the technology described above in the vertical MIMO with equal intervals, and the correct speed cannot be determined. That is, the technology for expanding the observable speed in the MIMO of chirp signals with equal intervals has a problem that it cannot be applied to the vertical MIMO with equal intervals. On the other hand, in this embodiment, the plurality of vertical arrival angle estimation values corresponding to the plurality of speed candidates that is the result of the speed expansion differs, one true vertical arrival angle is determined from the plurality of vertical arrival angle estimation values, and the speed corresponding to the vertical arrival angle can be determined as a true speed. For this reason, it is appliable to the vertical MIMO with equal intervals.

The speed determination unit may perform arrival angle estimation by fast Fourier transform (FFT) or discrete Fourier transform (DFT).

This embodiment is appliable to both FFT and DFT.

The speed determination unit may perform arrival angle estimation by CAPON, MUSIC, ESPRIT, or compression sensing.

An information processing device according to an embodiment of the present disclosure includes:

a speed determination unit that calculates a plurality of speed candidates on a basis of a plurality of chirp signals received by a reception antenna array of a speed detection apparatus including a transmission antenna array and the reception antenna array, the transmission antenna array transmitting a plurality of chirp signals multiplexed between a plurality of transmission antennas arranged in a vertical direction, the reception antenna array including a plurality of reception antennas receiving the plurality of chirp signals that has been reflected, and determines whether or not a plurality of vertical arrival angle estimation values corresponding to the plurality of speed candidates falls within a vertical angle threshold range, and determines, as a true speed, one speed candidate from the plurality of speed candidates on a basis of a determination result.

An information processing method according to an embodiment of the present disclosure includes:

in a speed detection apparatus including a transmission antenna array that transmits a plurality of chirp signals multiplexed between a plurality of transmission antennas arranged in a vertical direction, and a reception antenna array that includes a plurality of reception antennas receiving the plurality of chirp signals that has been reflected, calculating a plurality of speed candidates on a basis of the plurality of chirp signals received by the reception antenna array; and determining whether or not a plurality of vertical arrival angle estimation values corresponding to the plurality of speed candidates falls within a vertical angle threshold range, and determining, as a true speed, one speed candidate from the plurality of speed candidates on a basis of a determination result.

BRIEF DESCRIPTION OF DRAWINGS

FIG. 18 shows an example of the value of the residual speed phase difference.

MODE (S) FOR CARRYING OUT THE INVENTION

An embodiment of the present disclosure will be described below with reference to the drawings.

1. Overview of Typical Technology

Figure 1:
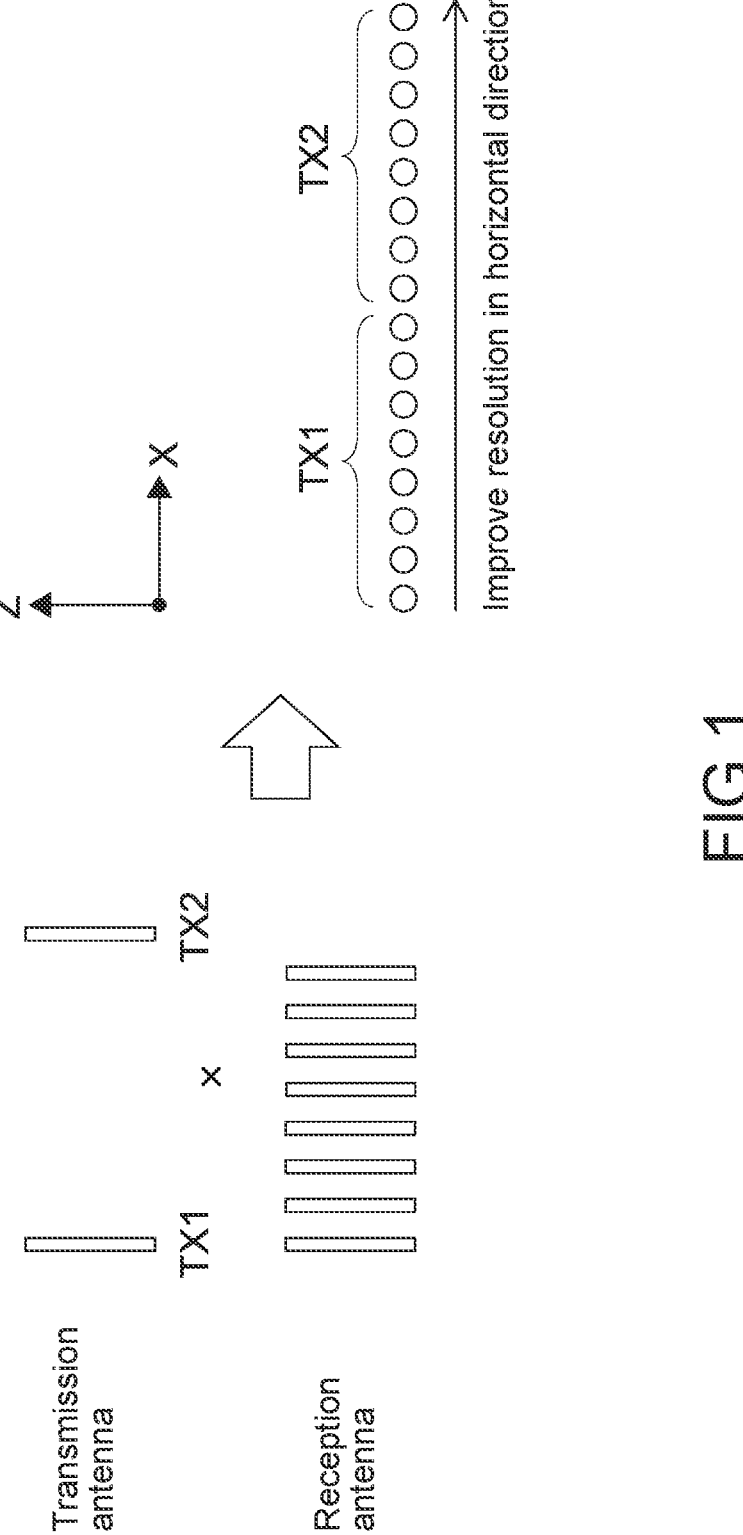
FIG. 1 schematically shows the concept of the horizontal MIMO.
Figure 2:
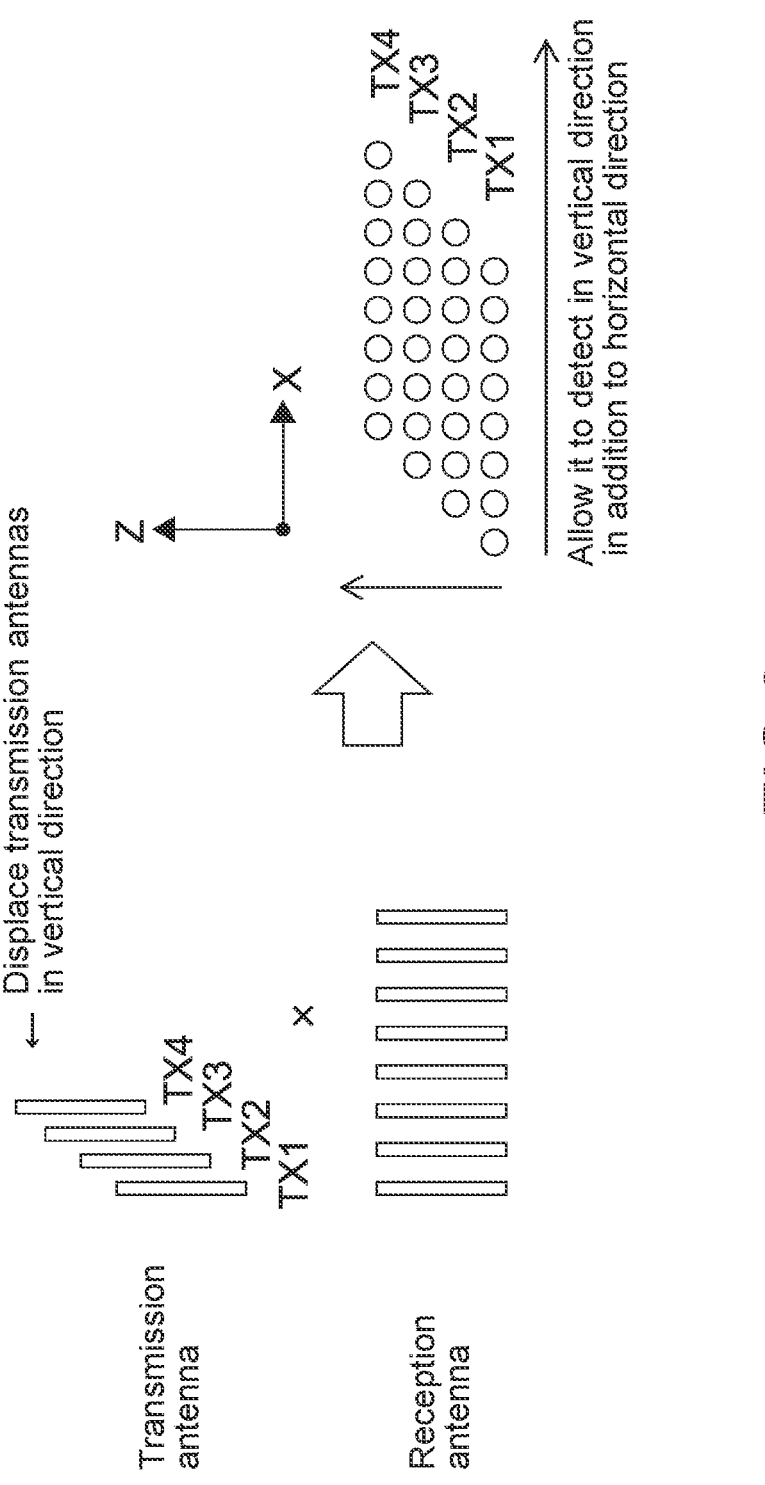
FIG. 2 schematically shows the concept of the vertical MIMO.

FIG. 1 schematically shows the concept of the horizontal MIMO. FIG. 2 schematically shows the concept of the vertical MIMO.

The MIMO is a method of virtually increasing the opening length (i.e., reception area of the antenna) by spatially displacing a plurality of (two in this example) transmission antennas with respect to a plurality of (eight in this example) reception antennas. Displacing a plurality of transmission antennas in the horizontal direction improves the resolution in the horizontal direction (FIG. 1). Displacing a plurality of transmission antennas in the vertical direction improves the resolution in the vertical direction in addition to the horizontal direction (FIG. 2).

Figure 3:
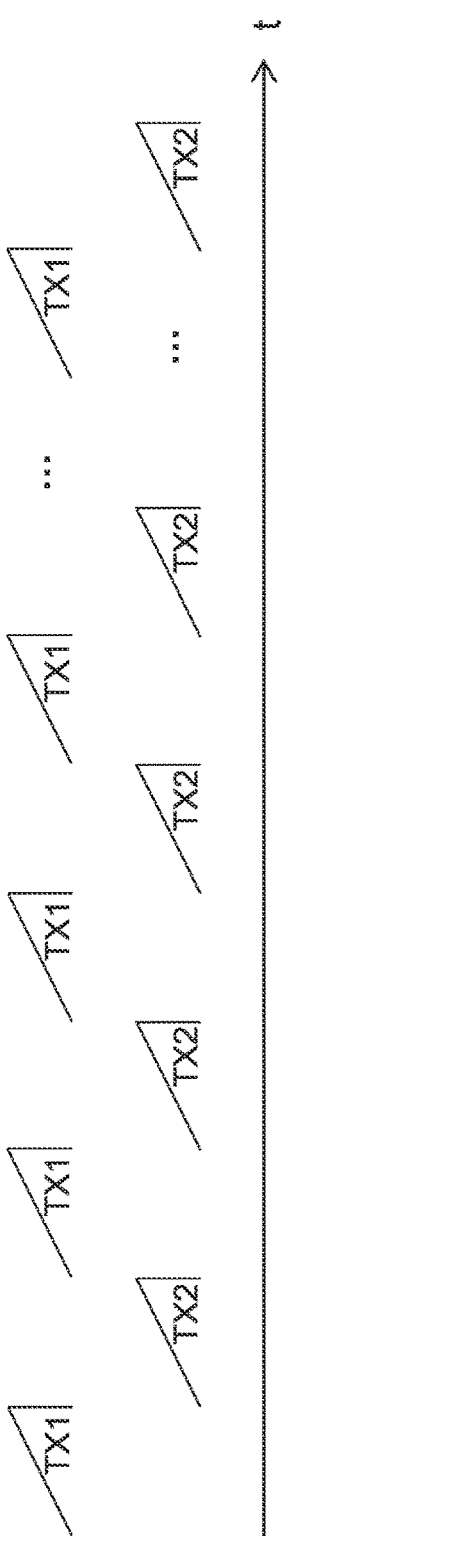
FIG. 3 schematically shows the concept of TDM-MIMO.

FIG. 3 schematically shows the concept of TDM-MIMO.

In the case of realizing a MIMO radar, in general, time division multiplexing (TDM)-MIMO is often used as a method of transmitting chirp signals. In the TDM-MIMO, chirp signals to be transmitted from transmission antennas forming MIMO are transmitted in time division by the number of transmission antennas. For example, in MIMO with two transmission antennas, the two transmission antennas alternately transmit chirp signals TX1 and TX2. Here, there is a time lag between the transmission timings of the chirp signals TX1 and TX2 from the two transmission antennas. Therefore, in the case where an object has a speed (e.g., an oncoming vehicle), a phase shift occurs between a reception signal formed by the chirp signal TX1 from a first transmission antenna and a reception signal formed by the chirp signal TX2 from a second transmission antenna due to speed and time shifts.

Figure 4:
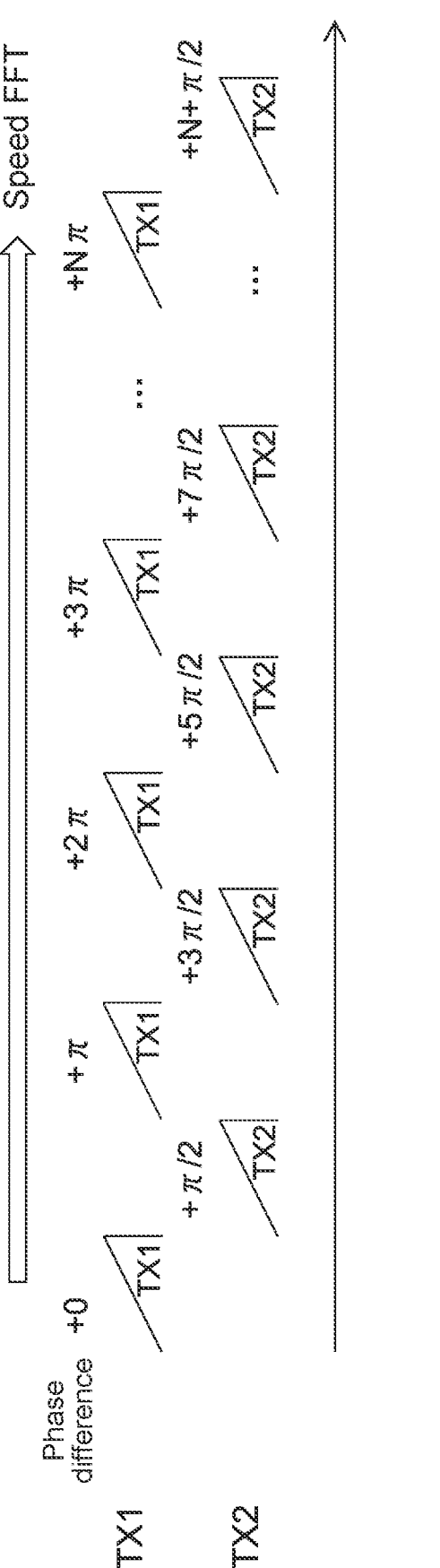
FIG. 4 schematically shows the concept of speed phase error correction of TDM-MIMO.

FIG. 4 schematically shows the concept of speed phase error correction of TDM-MIMO.

The speed of the object can be calculated by performing fast Fourier transform (FFT) (speed FFT) in the chirp direction on each of the chirp signals TX1 and TX2 after separating chirp signals multiplexed between a plurality of transmission antennas in the TDM-MIMO for each transmission antenna. Further, the speed FFT is capable of detecting the phase lead and lag due to the speed. In the example of FIG. 4, the phase advances by +π between a plurality of chirp signals TX1 from the first transmission antenna due to the speed. As shown in FIG. 4, if the phase difference between the plurality of chirp signals TX1 from the first transmission antenna due to the speed is +π, the phase of the chirp signal TX1 from the first transmission antenna and the phase of the chirp signal TX2 from the second transmission antenna are shifted by +π/2 (i.e., the phase error between TX1-TX2 is +π/2). For this reason, correcting the phase of the chirp signal TX2 from the second transmission antenna by −π/2 eliminates the phase difference between the chirp signal TX1 from the first transmission antenna and the chirp signal TX2 from the second transmission antenna. Even in the case where the object has a speed, the phase error between the chirp signal TX1 from the first transmission antenna and the chirp signal TX2 from the second transmission antenna can be corrected in this way.

Figure 5:
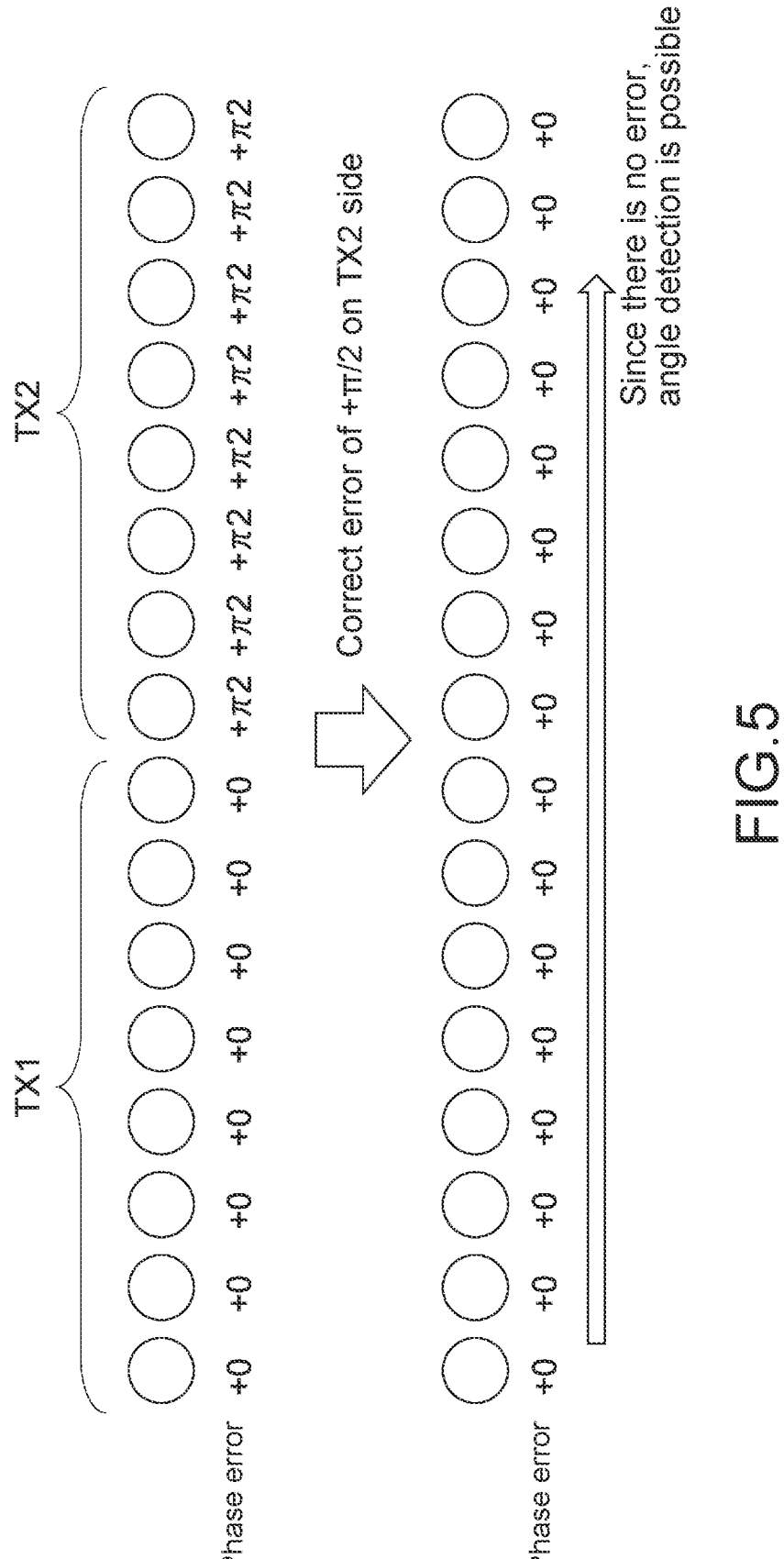
FIG. 5 schematically shows the concept of speed phase error correction of TDM-MIMO.

FIG. 5 schematically shows the concept of speed phase error correction of TDM-MIMO.

As described with reference to FIG. 4, when the phase difference between the plurality of chirp signals TX1 from the first transmission antenna is +π and the phase error between TX1-TX2 is +π/2, by correcting the phase of the chirp signal TX2 from the second transmission antenna by −π/2, the error between the chirp signals TX1 and TX2 is eliminated and angle detection is made possible.

Figure 6:
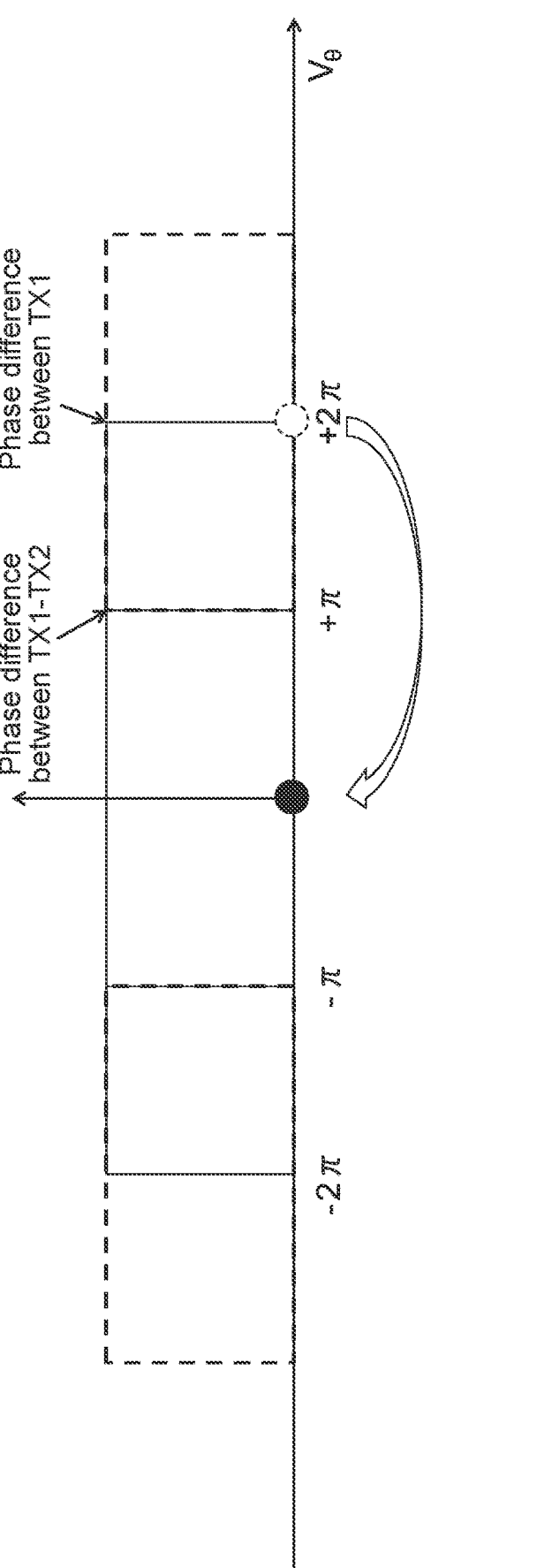
FIG. 6 schematically shows the concept of the limitation of speed phase correction due to speed ambiguity.

FIG. 6 schematically shows the concept of the limitation of speed phase correction due to speed ambiguity.

In accordance with the sampling theorem, the phase difference by the speed FFT can be detected only from −π to +π. However, in practice, the phase due to the speed exceeds +π in some cases. For example, in the case where the phase difference between chirps of the plurality of chirp signals TX1 from the first transmission antenna is +2π, the phase difference of +2π wraps to +0 when performing FFT.

Figure 7:
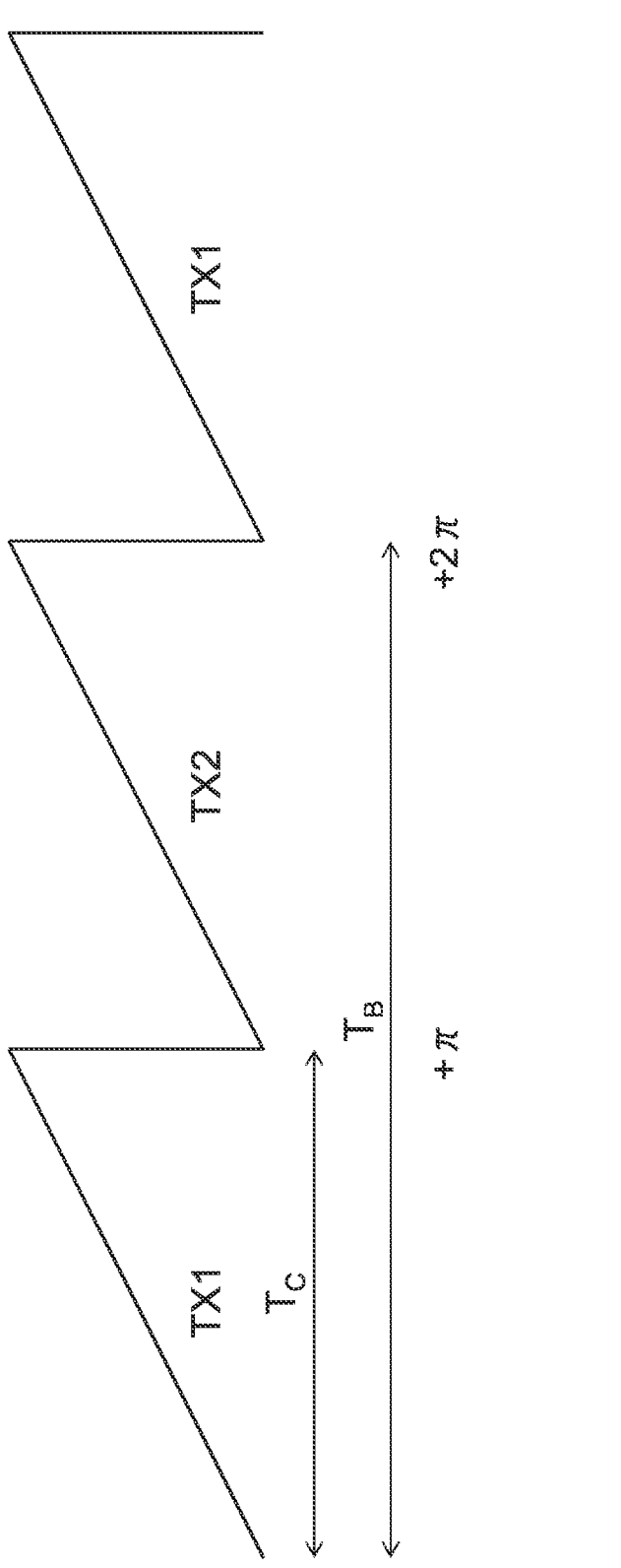
FIG. 7 schematically shows the concept of the limitation of speed phase correction due to speed ambiguity.

FIG. 7 schematically shows the concept of the limitation of speed phase correction due to speed ambiguity.

Typically, chirp signals are transmitted such that transmission timings of the chirp signals TX are equal to the burst intervals TB. The burst intervals TB are intervals between the plurality of chirp signals from the same antenna when separating the chirp signals multiplexed between the transmission antennas for each transmission antenna. That is, the chirp signal TX1 from the first transmission antenna and the chirp signal TX2 from the second transmission antenna are transmitted at equal intervals at the timings of 0 [μs] and TB×½ [μs], respectively. Assuming that the chirp intervals Tc are equal intervals, an angular velocity ω is obtained by the formula (1).

$$\omega = \varphi/(Ntx \cdot Tc) = \varphi/TB \ [rad \cdot /s] \qquad (1)$$

As shown by the above formula, in the case where the angular velocity ω=2π/TB, since the phase moves by +2π at each of the intervals TB, the phase moving at each of the chirp intervals Tc is +π.

Figure 8:
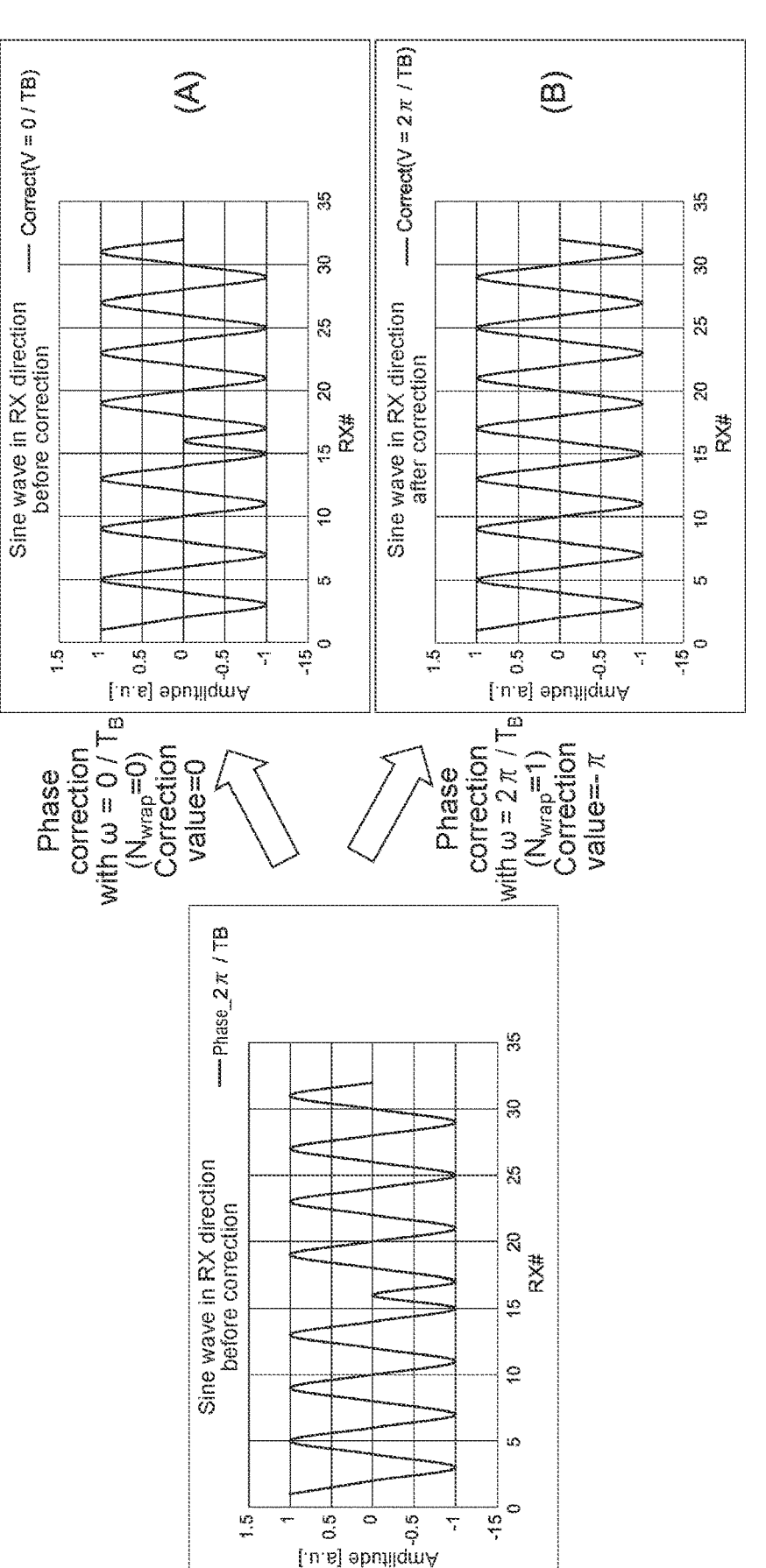
FIG. 8 shows correction of a phase difference due to speed ambiguity.

FIG. 8 shows correction of a phase difference due to speed ambiguity.

In the case where the angular velocity of the chirp signals TX1 and TX2 from the two transmission antennas in the A-MIMO satisfies the relationship of ω=2π/TB, the phase difference between the chirp signals TX1 and TX2 is n. However, the detected angular velocity satisfies the relationship of ω=0/TB. As shown in Part (A), in the case where the phase is corrected assuming that ω=0/TB and the number of speed wraps Nwrap=0, the correction value=0. As shown in Part (B), in the case where the phase is corrected assuming that ω=2π/TB and the number of speed wraps Nwrap=1, the correction value=−π. In the case of performing correction assuming that the number of speed wraps Nwrap=1, a sine wave with a continuous phase is obtained. At this time, in the arrival angle spectrum (AoA spectrum), the main lobe takes the largest value and the ratio between the main lobe and the side lobe becomes maximum.

Figure 9:
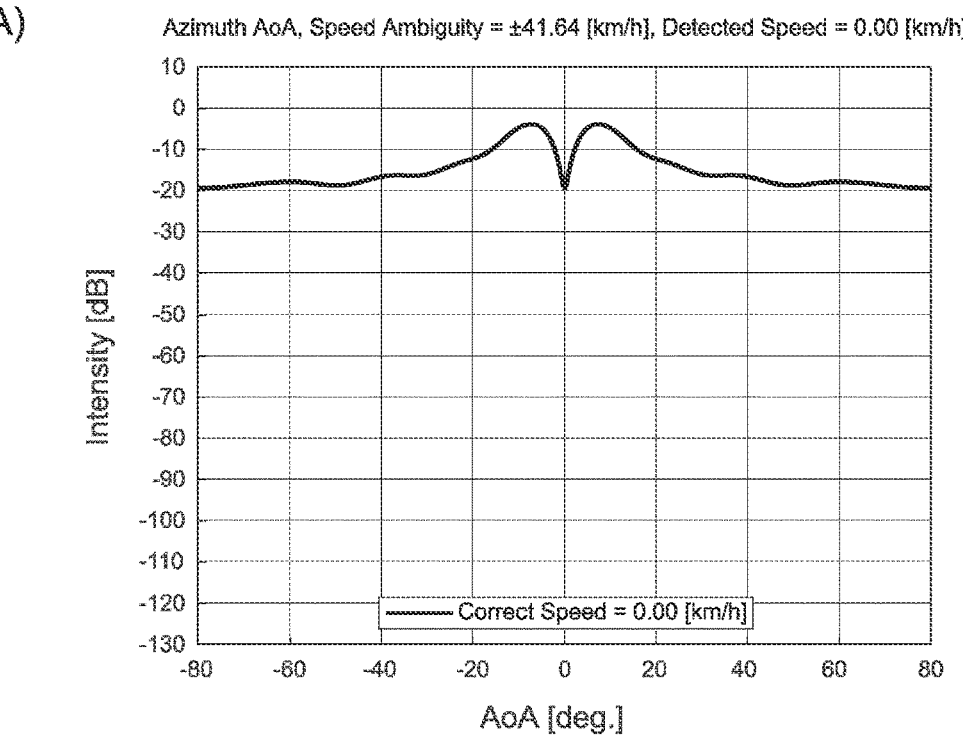
FIG. 9 shows correction of a phase difference due to speed ambiguity.
Figure 9:
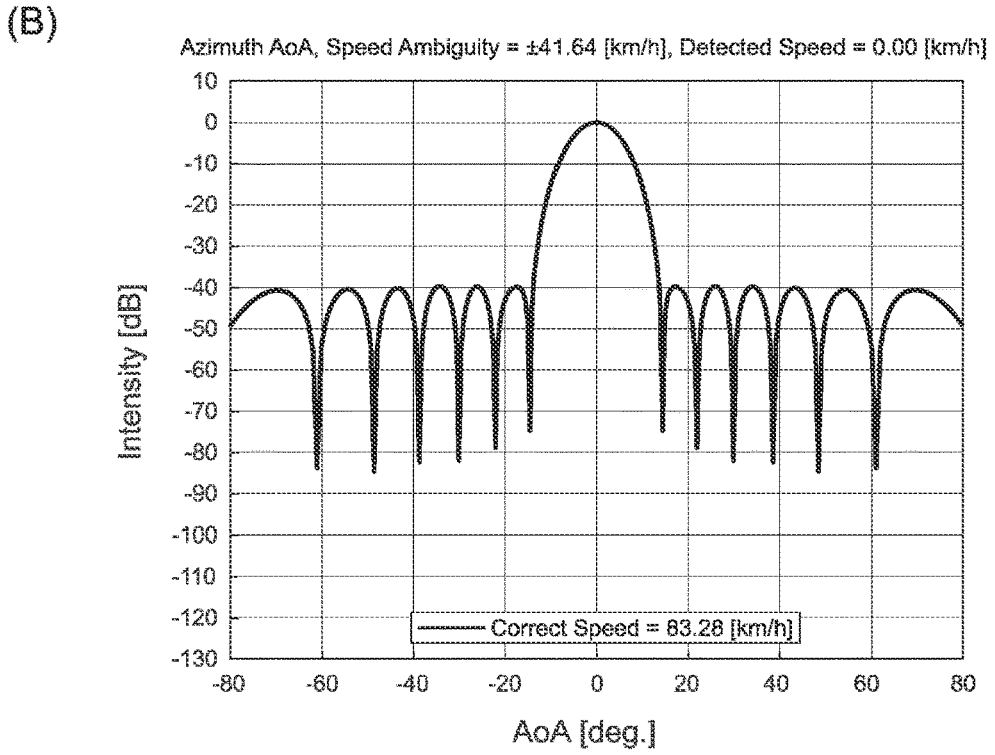

FIG. 9 shows correction of a phase difference due to speed ambiguity.

FFT is performed on the sine wave in the direction of the reception antenna after the correction shown in Parts (A) and (B) of FIG. 8. In both cases, a speed ambiguity Vambi=±41.64 [km/h], a detection speed by the speed FFT Vdet=0 [km/h], and an actual speed Vreal=83.28 [km/h]. The only difference is the number of speed wraps Nwra=0 (A) and 1 (B). When FFT is performed on the sine wave in the direction of the reception antenna after the correction shown in Part (A) of FIG. 8, an erroneous spectrum is obtained as shown in Part (A) of FIG. 9. When FFT is performed on the sine wave in the direction of the reception antenna after the correction shown in Part (B) of FIG. 8, a correct spectrum is obtained as shown in Part (B) of FIG. 9.

As described above, the phase error due to the speed between the chirp signals TX1 and TX2 from the two transmission antennas in the TDM-MIMO can be detected and corrected by the result of the speed FFT. However, the above-mentioned phase correction is limited to a range of −π to +π in accordance with the sampling theorem. Even in the case where the phase wraps beyond the range of −π to +π, it is possible to expand the phase correction range to approximately −2π to +2π by performing correction on the assumption of the number of wraps. As a result, it is known that the speed range can be expanded.

However, in the configuration in which phase differences due to speed wrapping between chirps from different transmission antennas can be discontinuous in the reception antenna direction in the horizontal direction as in the horizontal MIMO shown in FIG. 1, an explicitly erroneous angle spectrum is obtained in the false speed as shown in FIG. 9, but such a discontinuous phase difference cannot occur in the vertical MIMO shown in FIG. 2.

That is, since the intervals for transmitting chirp signals are equal intervals, the phase difference of the speed and the phase difference of the height cannot be distinguished from each other because the phase difference of the speed and the phase difference of the height have the same linearity even in the case of trying to expand the speed by the technology described above in the vertical MIMO with equal intervals, and the correct speed cannot be determined. That is, the technology described above has a problem that it cannot be applied to the vertical MIMO with equal intervals.

In a radar in which chirp signals are transmitted at equal intervals in the vertical MIMO with equal intervals, the observable speed of the height detection MIMO is limited. That is, there is a trade-off relationship between the observable speed and the number of transmission antennas. The observable speed decreases as the number of transmission antennas increases. Even if an attempt is made to expand the speed to recover the decreased observable speed, it is difficult to estimate the correct height with the combination of the equidistant antenna and the equidistant chirp. For this reason, there is a problem that correct information (height information) of a target outside the observable speed cannot be obtained.

In view of the circumstances as described above, it is desired to further widen the speed expansion range in a radar in which chirp signals are transmitted at equal intervals in the vertical MIMO with equal intervals, and accurately obtain the height and speed of a target faster than the original observable speed.

2. This Embodiment

Figure 10:
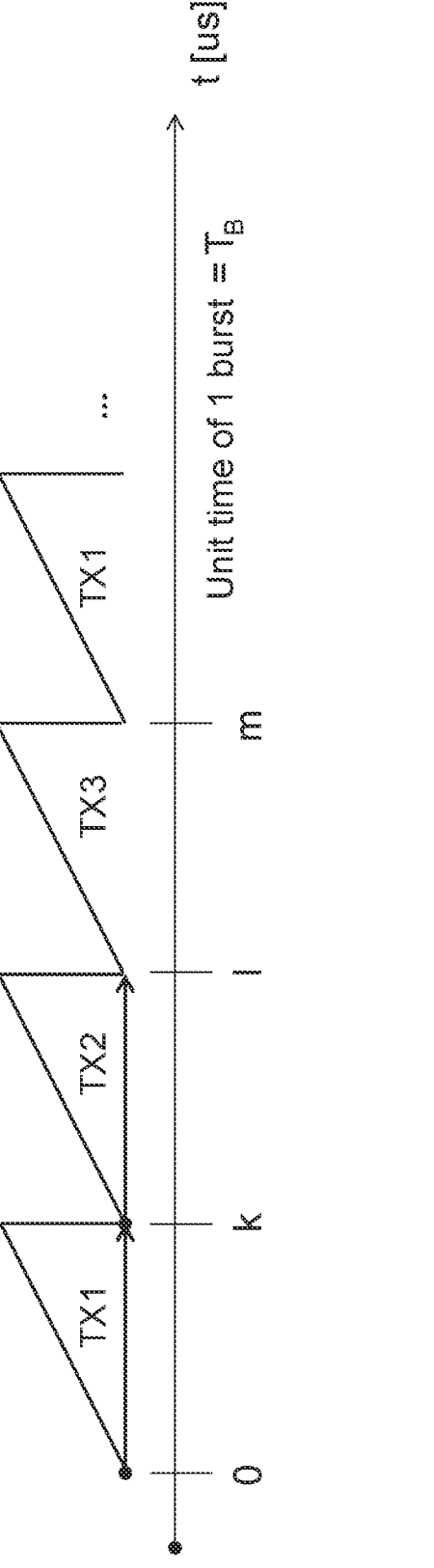
FIG. 10 is a diagram schematically showing transmission intervals of chirps in the case where the number of transmission antennas Ntx=3.

(1) Relationship of Phase Difference Between Transmission Antennas Due to Speed FIG. 10 is a diagram schematically showing transmission intervals of chirps in the case where the number of transmission antennas Ntx=3.

Chirp signals are transmitted such that the transmission timings of each chirp signal Tx are equal to the burst intervals TB. The burst intervals TB are intervals between a plurality of chirp signals from the same antenna when chirp signals multiplexed between the transmission antennas are separated for each of the transmission antennas. The chirp signal TX1 from the first transmission antenna, the chirp signal TX2 from the second transmission antenna, the chirp signal Tx3 from the third transmission antenna, and the next chirp signal TX1 from the first transmission antenna are transmitted at equal intervals at timings of 0 [μs], k [μs], 1 [μs], and m [μs], respectively.

When Tx1=0, the speed phases of Tx2 and Tx3 are as follows.

$$Tx2 = (V\det + 2 \times V \lim \times N\text{wrap}) \times (k/m) \times T_B$$

$$Tx3 = (V\det + 2 \times V \lim \times N\text{wrap}) \times (l/m) \times T_B$$

When k:l:m=1: l/k:m/k (where l/k and m/k are integers) is established,
    the following formulae are obtained, l/k=α, m/k=B, summarizing with $V\lim \times T_B = \pi$.

$$Tx2 = V\det \times (1/\beta) \times T_B + 2\pi \times N\text{wrap} \times (1/B)$$

$$Tx3 = V\det \times (\alpha/\beta) \times T_B + 2\pi \times N\text{wrap} \times (\alpha/\beta)$$

At this time, wrapping occurs at a period of Namb=β=(m/k). Here, k and I are chirp signals with equal intervals. For this reason, in the case where the number of transmission antennas Ntx=3, the following formulae are established.

$$(l/k) = 2$$

$$(m/k) = 3$$

$$Tx2 = (V\det + 2 \times V \lim \times N\text{wrap}) \times (\tfrac{1}{3}) \times T_B = V\det \times (\tfrac{1}{3}) \times$$
$$T_B + 2\pi \times N\text{wrap} \times (\tfrac{1}{3})$$

$$Tx3 = (V\det + 2 \times V \lim \times N\text{wrap}) \times (\tfrac{2}{3}) \times T_B = V\det \times (\tfrac{2}{3}) \times$$
$$T_B + 2 \times N\text{wrap} \times (\tfrac{2}{3})$$

Since 2π wrapping occurs in a period where Nwrap×(⅓) is an integer, up to three Nwrap can be calculated in the case where the number of transmission antennas Ntx=3. That is, each of Tx2 and Tx3 takes a different speed phase with respect to three types of speed wrapping of −1, 0, and +1.

When the height phase is 0°, the phase of the speed between the plurality of transmission antennas is as shown above by the speed (Vdet+2π×Nwrap). At this time, the term with which Vdet is multiplied can be corrected by the speed calculated by speed fast Fourier transform (FFT). That is, of the above formula, the term Vdet×(⅓)×TB and the term Vdet×(⅔)×TB can be corrected. For this reason, the residual speed phase due to the speed wrapping is given by the following formulae (2).

$$Tx1 = 0$$

$$Tx2 = 2\pi \times N\text{wrap} \times (\tfrac{1}{3})$$

$$Tx3 = 2\pi \times N\text{wrap} \times (\tfrac{2}{3})$$

For example, in the case where Nwrap=0 is the number of true speed wraps, Tx1=0, Tx2=0, and Tx3=0 are the original phases. That is, it is not necessary to correct the phase of the speed wrapping. However, when performing correction assuming the erroneous wrap such as Nwrap=−1 and Nwrap=+1, the following two examples are obtained.

As a first example, when correcting the phase assuming the wrapping of Nwrap=−1, substituting Nwrap=+1 into the above formula obtains the following formulae.

$$Tx1 = 0$$

$$Tx2 = 2\pi \times (\tfrac{1}{3})$$

$$Tx3 = 2\pi (\tfrac{2}{3})$$

As a second example, when correcting the phase assuming the wrapping of Nwrap=+1, substituting Nwrap=−1 into the above formula obtains the following formulae.

$$Tx1 = 0$$

$$Tx2 = -2\pi \times (\tfrac{1}{3})$$

$$Tx3 = -2\pi (\tfrac{2}{3})$$

Here, assumption is made that the detected speed Vdet=0, the true speed Vreal=0 (the number of wraps is zero, i.e., the phase difference between Tx is zero), and the true height is 0°. At this time, the phases of Tx2 and Tx3 when assuming that, for example, the number of wraps is −1 are obtained by the following formulae.

$$Tx2 = 2\pi/3$$

$$Tx3 = 4\pi/3$$

Figure 11:
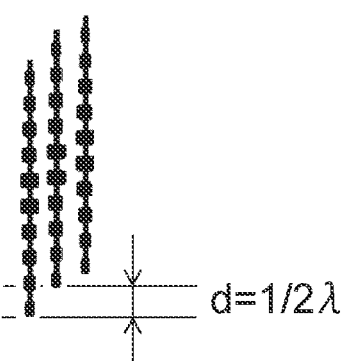
FIG. 11 schematically shows a difference in height between the transmission antennas.

FIG. 11 schematically shows a difference in height between the transmission antennas.

Regarding the relationship between the phase difference between the transmission antennas and the arrival angle, the following formula is established.

$$d \sin \theta = \lambda \times (\Delta\varphi/2\pi)$$

Now, Tx2 is obtained. Assumption is made that the difference in height between the transmission antennas d=½λ. Δφ=2π/3. For this reason, the following formula is established.

$$(\lambda/2) \cdot \sin \theta = \lambda \times (2\pi/3)/2\pi$$

$$\sin \theta = \tfrac{2}{3}$$

$$\sin^{-1}(\tfrac{2}{3}) = 41.81 [\text{deg.}]$$

That is, assuming that the number of speed wraps is −1, the arrival angle points to approximately 42°. In the case where the number of speed wraps is +1, the arrival angle points to approximately −42°, similarly. That is, the arrival angles in the height direction when assuming the number of speed wraps is −1, 0, and +1 are respectively obtained as −42°, 0°, and +42°.

Figure 12:
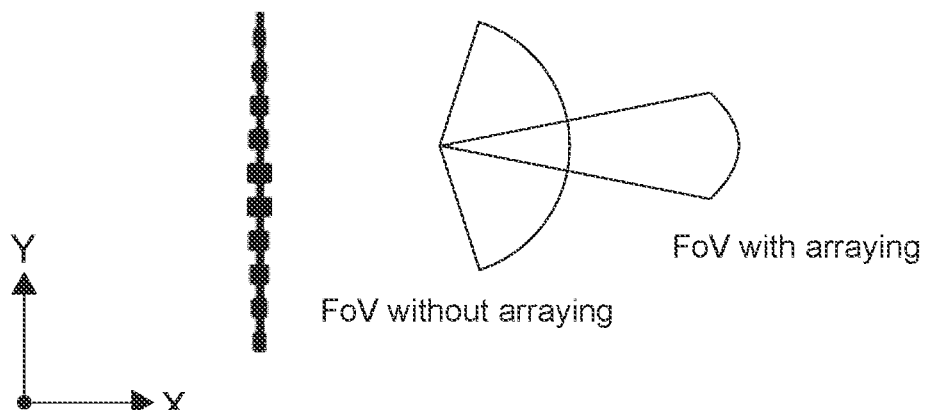
FIG. 12 schematically shows FoV in the vertical direction of the arrayed antenna.

FIG. 12 schematically shows FoV in the vertical direction of the arrayed antenna.

In the in-vehicle radar, FoV in the vertical direction (height direction) of the antenna can be narrowed down. The first reason is that it is not necessary to have sensitivity in the ground direction and the sky direction (it is desired to reduce the sensitivity to the reflection from the ground). In other words, in the in-vehicle radar that should detect a forward vehicle or the like, a target such as a forward vehicle cannot be present under the ground or in the sky. The second reason is that it is desired to direct the gain in the front direction and detect more distant targets. Here, patch antennas generally used in in-vehicle radars can be arrayed in the vertical direction to narrow down FoV in the vertical direction and further direct the gain in the front direction (further increase the sensitivity in the front direction).

Figure 13:
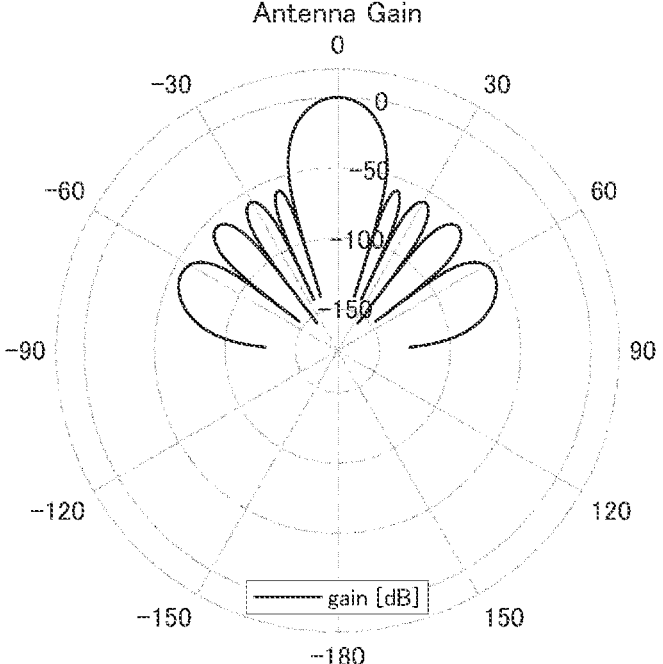
FIG. 13 shows an example of an angle of a radar in the height direction and a gain.

FIG. 13 shows an example of an angle of a radar in the height direction and a gain.

In accordance with this graph, the gain in the 0° front direction is the largest. The gain is reduced to approximately −15 dB at approximately ±10°. From ±30° to wider angles, the gain is reduced to approximately −60 dB and there is substantially no gain. Therefore, ±15 is the realistic FoV.

(2) Concept of this Embodiment

Figure 14:
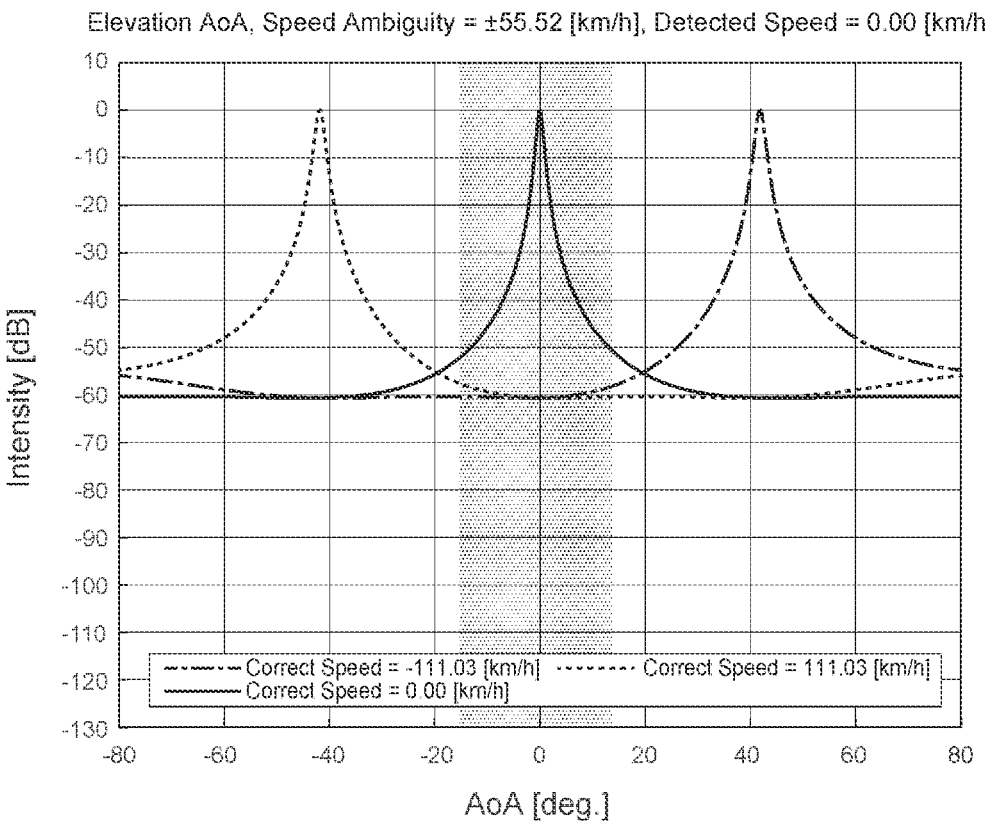
FIG. 14 shows an example of a case where the true speed wrapping is zero.

FIG. 14 shows an example of a case where the true speed wrapping is zero.

When assuming that ±15° is the realistic FoV, the speed candidates when the vertical arrival angle estimation value is −42° and +42° are excluded from the candidates because they are outside FoV. Specifically, in accordance with this graph, the vertical arrival angle estimation values of −42° and +42° (peak values of the graph are −42° and +42°) are not included in the vertical angle threshold range (−15° to +15°). Therefore, the vertical arrival angle estimation values of −42° and +42° are not true vertical arrival angles, and the speed candidates (−111.03 km/h and 111.03 km/h) corresponding to these are not true speeds.

Meanwhile, the vertical arrival angle estimation value of 0° (peak value of the graph is 0°) is included in the vertical angle threshold range (−15° to +15°). As a result, it is possible to determine that the vertical arrival angle estimation value of 0° is a true vertical arrival angle and the speed candidate (0 km/h) corresponding to this is a true speed.

As described above, in accordance with this embodiment, the speed is expanded (in this example, the speed wrapping is calculated three times of −1, 0, and +1 for Ntx=3), and the height is detected. In the obtained results, the electric power (Intensity (dB)) is the same but the height (AoA, Angle of Arrival) greatly differs. In this regard, the vertical arrival angle (height) with the peak in the vertical angle threshold range of the transmission antenna in the vertical direction (vertical angle threshold range) is determined as a true vertical arrival angle (height). The speed corresponding to the vertical arrival angle is determined as a true speed.

Figure 15:
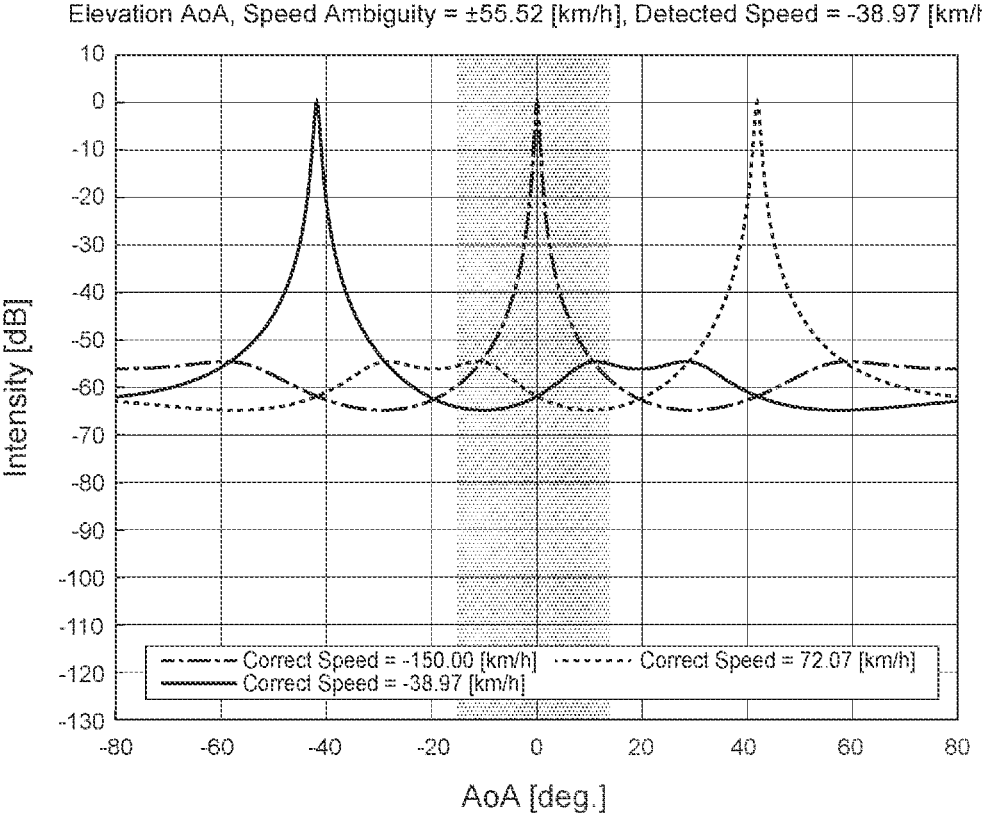
FIG. 15 shows an example of a case where the true speed wrapping is −1.

FIG. 15 shows an example of a case where the true speed wrapping is −1.

When the true speed wrapping is −1, the vertical arrival angle estimation value of 0° (peak value of the graph is 0°) is included in the vertical angle threshold range (−15° to +15°). As a result, it is possible to determine that the vertical arrival angle estimation value of 0° is a true vertical arrival angle and the speed candidate (−150 [km/h]) corresponding to this is a true speed.

Figure 16:
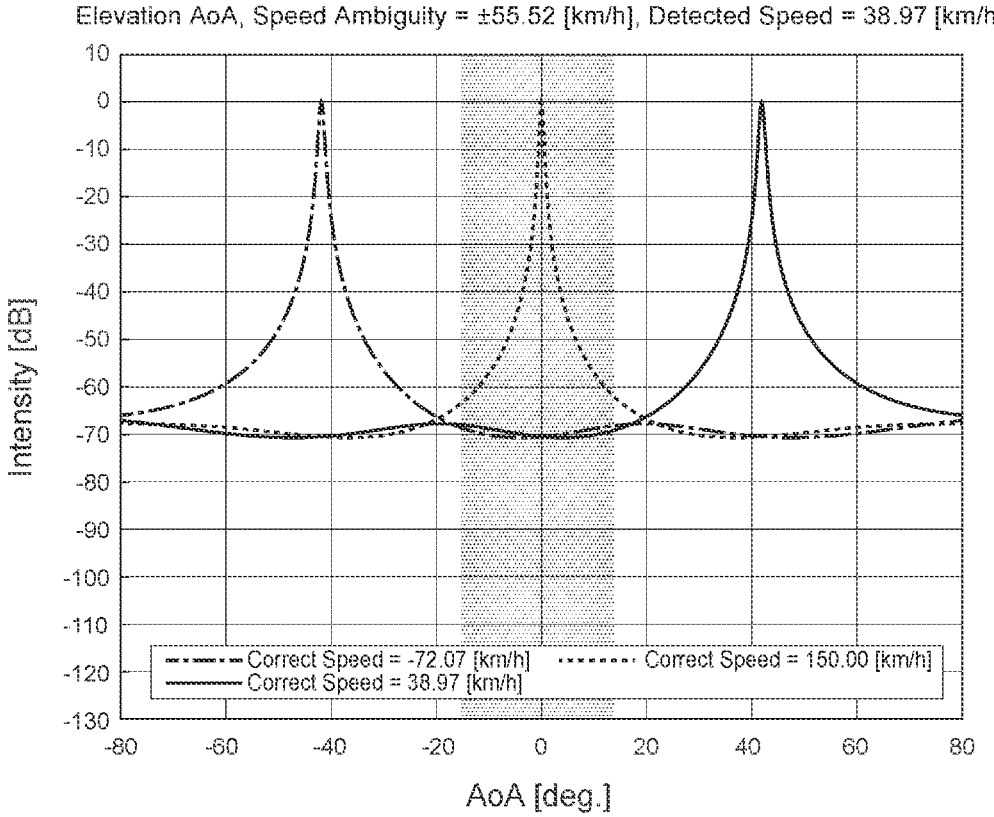
FIG. 16 shows an example of a case where the true speed wrapping is +1.

FIG. 16 shows an example of a case where the true speed wrapping is +1.

When the true speed wrapping is +1, the vertical arrival angle estimation value of 0° (peak value of the graph is 0°) is included in the vertical angle threshold range (−15° to +15°). As a result, it is possible to determine that the vertical arrival angle estimation value of 0° is a true vertical arrival angle and the speed candidate (150 [km/h]) corresponding to this is a true speed.

Here, the number of graphs with the peak (vertical arrival angle estimation value) included in the vertical angle threshold range needs to be one. This is because, if a plurality of graphs has a peak included in the vertical angle threshold range, which of these peaks (vertical arrival angle estimation values) is a true vertical arrival angle cannot be determined. For this reason, it is favorable that the vertical angle threshold range can be dynamically changed. For example, it is favorable that the vertical angle threshold range can be dynamically changed on the basis of the number of and intervals between the plurality of transmission antennas, the distance from the transmission antenna array, the mounting height of the speed detection apparatus in the vertical direction, the mounting angle error of the speed detection apparatus, and the like. The theory thereof will be described below.

Figure 17:
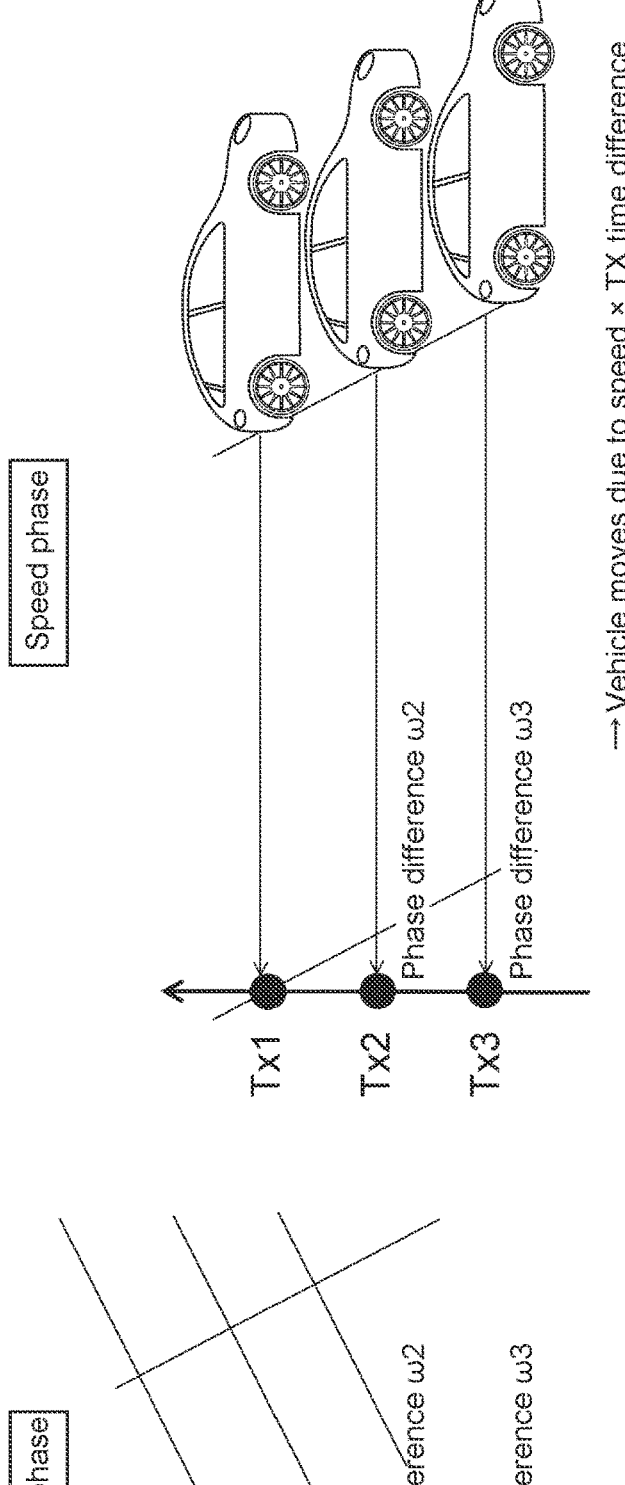
FIG. 17 schematically shows a relationship between the residual speed phase due to speed wrapping and the height phase.

(3) Relationship Between Residual Speed Phase Due to Speed Wrapping and Height FIG. 17 schematically shows a relationship between the residual speed phase due to speed wrapping and the height phase.

The relationship between the residual speed phase due to speed wrapping and the height will be described. The plurality of transmission antennas Tx1, Tx2, and Tx3 has a difference in the height direction (height phase) because they constitute a vertical MIMO array, and has a time difference in the transmission timing of the chirp signal. The target (forward vehicle) moves (speed phase) due to the speed×the time difference between the transmission antennas. At this time, the height phase difference and the speed phase difference of a target having a height is detected as a phase difference between the transmission antennas, similarly. For this reason, even if the height is zero, an erroneous height is detected when a speed phase difference remains. That is, the phase difference of the speed and the phase difference of the height have the same linearity, and the phase difference of the speed and the phase difference of the height cannot be distinguished from each other.

(4) Number of Antennas and Residual Speed Phase Due to Speed Wrapping

The speed wrap phase between the plurality of transmission antennas Tx in the case where the number of antennas is Nant is represented by the Math. 1. However, mod is the modulo operation.

$$\Delta\varphi = \text{mod}\left(\frac{2\pi \cdot N_{wrap}}{N_{ant}} - \pi, 2\pi\right) - \pi \qquad \text{[Math. 1]}$$

The relationship between an interval d between the plurality of transmission antennas and a phase difference φ is represented by the following formula.

$$d \sin \theta spd = \lambda \times (\Delta \varphi / 2\pi)$$

Here, θspd is the phase difference between the transmission antennas, which behaves as a pseudo height phase due to the speed phase difference remaining by the assumption error of the number of speed wraps.

Replacing Δφ with the speed wrapping residual phase difference obtains the formula of Math. 2.

$$d\sin\theta_{spd} = \lambda \times \frac{\mod\left(\dfrac{2\pi \cdot N_{wrap}}{N_{ant}} - \pi, \ 2\pi\right) - \pi}{2\pi} \qquad \text{[Math. 2]}$$

Further, the antenna interval d can be determined by a ratio n to a wavelength λ. Assuming that d=nλ, the formula of Math. 3 is obtained.

$$\sin\theta_{spd} = \frac{\mod\left(\dfrac{2\pi \cdot N_{wrap}}{N_{ant}} - \pi, \ 2\pi\right) - \pi}{2\pi \cdot n} \qquad \text{[Math. 3]}$$

In this way, the height phase due to the speed wrapping is calculated by the formula of Math. 4.

$$\theta_{spd} = \sin^{-1}\left(\frac{\mod\left(\dfrac{2\pi \cdot N_{wrap}}{N_{ant}} - \pi, \ 2\pi\right) - \pi}{2\pi \cdot n}\right) \qquad \text{[Math. 4]}$$

Further, in the case where there is an actual arrival angle θele in the vertical direction in addition to θspd due to the speed wrapping, the following formula of Math. 5 is obtained.

$$\theta_{sum} = \sin^{-1}\left(\frac{\mod\left(\dfrac{2\pi \cdot N_{wrap}}{N_{ant}} - \pi + 2\pi \cdot k \cdot \sin\theta_{ele}, \ 2\pi\right) - \pi}{2\pi \cdot n}\right) \qquad \text{[Math. 5]}$$

Here, θsum is the sum of the actual arrival angle θele in the vertical direction and θspd due to the speed wrapping and is an angle to be detected as a pseudo arrival angle.

As for the value of $\sin^{-1}\theta$, since the argument of θ is smaller as the parameter is smaller, the following can be said. First, the larger the antenna interval ratio n (example: n=0.5), the smaller the height phase difference Δφ between different wraps. Second, the larger the number of antennas Nant, the smaller the height phase difference 40 between different wraps. That is, in order to prevent FoV (field of view range) from including a plurality of wrap speed candidates (for FoV to include only one wrap speed candidate), it only needs to make the antenna interval as narrow as possible and make the number of antennas as small as possible. Meanwhile, this is contrary to the general theory of increasing the resolution of arrival angle estimation in the speed detection apparatus (radar), which is to make the antenna interval as wide as possible and make the number of antennas as large as possible. For this reason, this embodiment is suitable for a speed detection apparatus (radar) with low resolution of arrival angle estimation in the height direction.

FIG. 18 shows an example of the value of the residual speed phase difference.

The figure shows the residual speed phase difference when the antenna interval ratio n=0.5 and the number of antennas Nant=3 or 4 in the formula of Math. 4. At this time, the smallest angle difference absolute value in the figure, i.e., the value of the residual speed phase difference when Nwrap=+1, is the limit at which two speed candidates are not included in FoV. Therefore, the vertical angle threshold range that is the limit of the vertical angle threshold range can be determined the following formula of Math. 5. Here, θFoVp-p is the width of the detection angle range in the positive and negative direction.

$$\theta_{FoVp-p} < \sin^{-1}\left(\frac{\mod\left(\dfrac{2\pi}{N_{ant}} - \pi, \ 2\pi\right) - \pi}{2\pi \cdot n}\right) \qquad \text{[Math. 6]}$$

Here, Nant needs to be two or more for arrival angle estimation (Nant≥2). For this reason, 2π/Nant is always equal to or less than n (2π/Nant≤π). Therefore, it is unnecessary to perform wrap correction from −π to +π by mod (modulo operation). For this reason, the above formula is simplified to the following formula.

$$\theta_{FoVp-p} < \sin^{-1}\left(\frac{1}{N_{ant} \cdot n}\right) \qquad \text{[Math. 7]}$$

Here, $\theta_{FoVp-p}$ is a width of angle threshold values in the vertical direction, $N_{ant}$ is the number of the plurality of transmission antennas that transmits the plurality of chirp signals to be used for vertical arrival angle estimation, and N is a ratio between an interval between the plurality of transmission antennas in the vertical direction and a wavelength in free space of the chirp signal transmitted by the transmission antenna array.

In the above, FoV has been calculated by the angle of the pseudo arrival angle due to other speed wrapping when θele is 0°. Actually, it is necessary to consider the case where θele takes a value other than 0° in this FoV. From the formula of Math. 5, the value of θsum is reduced when the number of wraps and θele have different signs. In this regard, the angle difference in the case where θele takes a positive angle when the number of speed wraps is −1 and 0 is obtained.

The difference in θsum between when the number of speed wraps is −1 and when the number of speed wraps is 0 is as follows.

$$\theta_{diff} = \left| \sin^{-1}\left(\frac{\mod\left(-\dfrac{2\pi}{N_{ant}} - \pi + 2\pi \cdot k \cdot \sin\theta_{ele}, \ 2\pi\right) - \pi}{2\pi \cdot n}\right) - \sin^{-1}\left(\frac{\mod(-\pi + 2\pi \cdot k \cdot \sin\theta_{ele}, \ 2\pi) - \pi}{2\pi \cdot n}\right) \right| \qquad \text{[Math. 8]}$$

Here, $\theta$diff is the difference in $\theta$sum between when the number of wraps is $-1$ and when the number of wraps is 0. Similarly to Math. 6, Math. 8 is also simplified to Math. 9 by excluding mod.

$$\theta_{diff} = \left| \sin^{-1}\left( \frac{-1}{N_{ant} \cdot n} + \sin\theta_{ele} \right) - \theta_{ele} \right| \qquad \text{[Math. 9]}$$

In Math. 9, the minimum value of $\theta$diff is the limit at which the arrival angle of the number of wraps different from the true number of wraps is not included in FoV at an arbitrary $\theta$ele (however, $\theta$ele is in the range of Math. 6). It is calculated by Math. 10.

$$\theta_{FoVp-p} = \min_{\theta_{ele}} \left| \sin^{-1}\left( \frac{-1}{N_{ant} \cdot n} + \sin\theta_{ele} \right) - \theta_{ele} \right| \text{ subject to} \qquad \text{[Math. 10]}$$

$$0 \le \theta_{ele} \le \sin^{-1}\left( \frac{1}{N_{ant} \cdot n} \right)$$

Here, $\theta_{FoVp-p}$ is a width of angle threshold values in the vertical direction, $N_{ant}$ is the number of the plurality of transmission antennas that transmits the plurality of chirp signals to be used for vertical arrival angle estimation, and N is a ratio between an interval between the plurality of transmission antennas in the vertical direction and a wavelength in free space of the chirp signal transmitted by the transmission antenna array.

In the speed detection apparatus according to this embodiment, the speed determination unit only needs to set the vertical angle threshold range with a value within the range that satisfies the formula of Math. 10.

Figure 19:
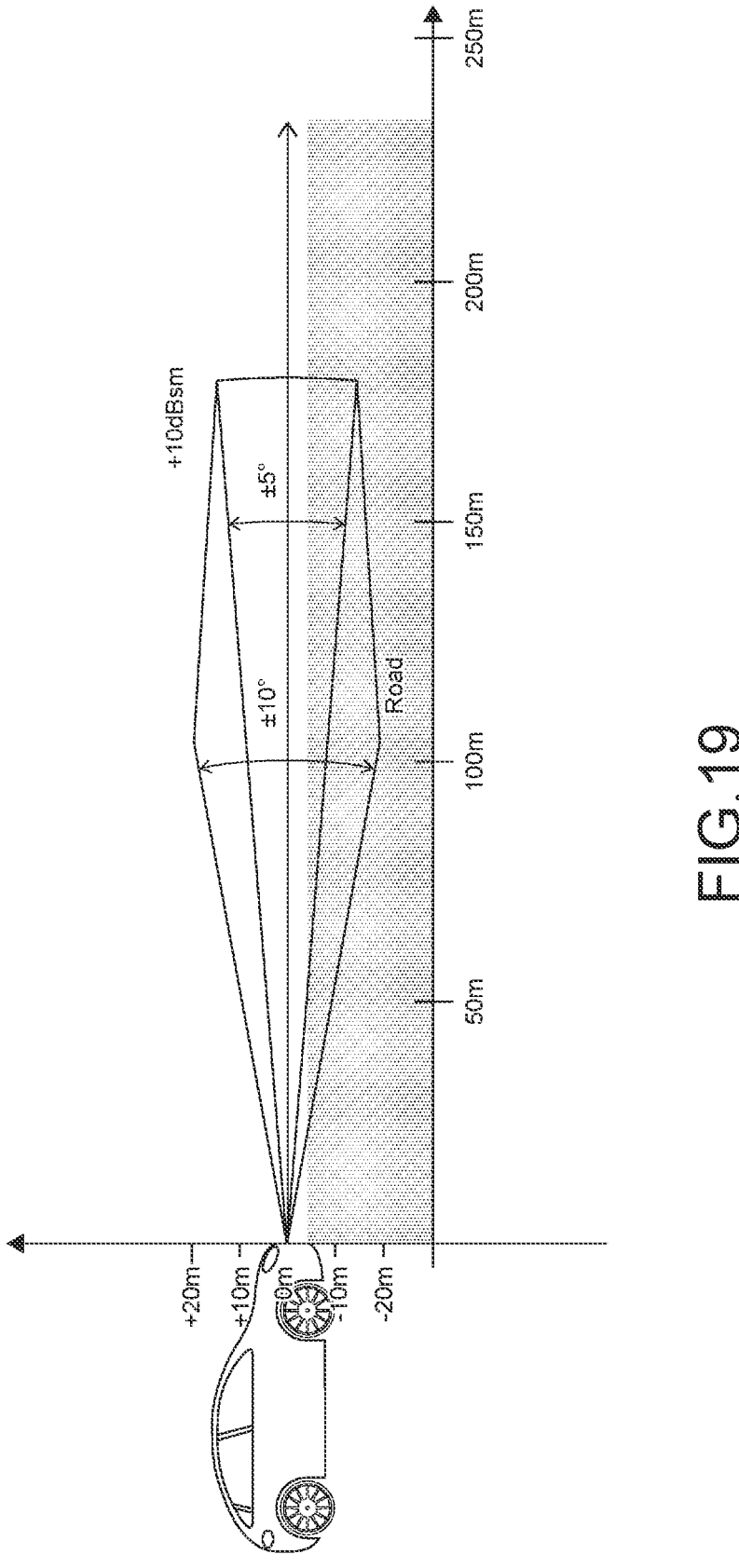
FIG. 19 schematically shows an example of FoV in the negative direction.

(5) Limitation of Vertical Angle Threshold Range in Negative Direction (Minus Direction) Due to Distance FIG. 19 schematically shows an example of FoV in the negative direction.

As described above, in the in-vehicle radar, the vertical angle threshold range of the antenna in the vertical direction (height direction) can be narrowed down. This is because it is not necessary to have sensitivity in the ground direction and the sky direction (it is desired to reduce the sensitivity to the reflection from the ground). In other words, in the in-vehicle radar that should detect a forward vehicle or the like, a target such as a forward vehicle cannot be present under the ground or in the sky. For this reason, in the in-vehicle radar, there is little need to consider the height in the negative direction particularly for long distances. Therefore, it is possible to further limit the vertical angle threshold range in the negative direction (direction toward the underground) to a narrower range.

Figure 20:
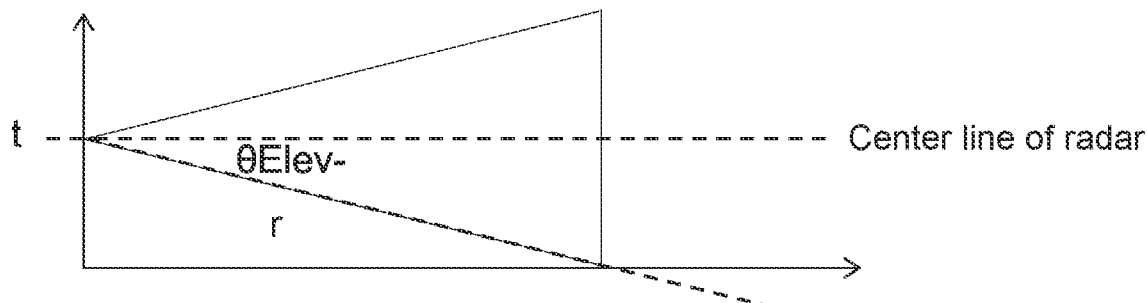
FIG. 20 schematically shows an example of limiting a vertical angle threshold range in the negative direction by distance.

FIG. 20 schematically shows an example of limiting a vertical angle threshold range in the negative direction by distance.

By dynamically calculating a vertical angle threshold range on the basis of a mounting height of the speed detection apparatus in the vertical direction, it is possible to determine a vertical angle threshold range more appropriately. For example, the mounting height of the speed detection apparatus (radar) is defined as t. The distance that the radio wave emitted from the height t reaches the ground is defined as r. The detection angle of the speed detection apparatus (radar) in the downward direction (negative direction) as viewed from the speed detection apparatus (radar) is defined as $\theta$Elev$-$. In this case, the following formula is established.

$$r \sin \theta \text{Elev}-=t$$

$$\omega \text{Elev}-=\sin^{-1}(t/r)$$

Figure 21:
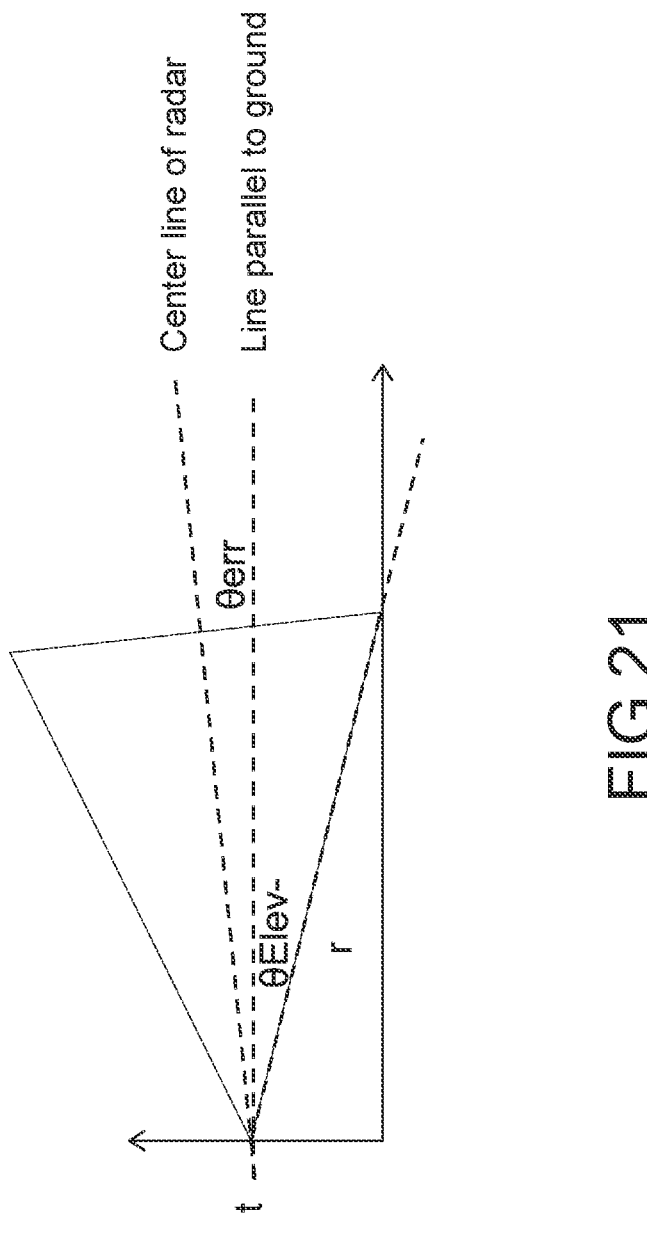
FIG. 21 schematically shows an example of limiting the vertical angle threshold range in the negative direction in consideration of a mounting angle error.

FIG. 21 schematically shows an example of limiting the vertical angle threshold range in the negative direction in consideration of a mounting angle error.

The detection angle of the speed detection apparatus (radar) in the downward direction (negative direction) as viewed from the speed detection apparatus (radar) is defined as $\theta$Elev$-$. The mounting angle error of the speed detection apparatus (radar) is defined as ferr. In the case of considering the mounting angle error of the speed detection apparatus (radar), the following formula is established. By dynamically calculating a vertical angle threshold range on the basis of not only the mounting height of the speed detection apparatus in the vertical direction and the mounting angle error, it is possible to determine a vertical angle threshold range more and more appropriately.

$$r \sin(\theta \text{Elev}-\theta \text{err})=t$$

$$(\theta \text{Elev}-\theta \text{err})=\sin^{-1}(t/r)$$

$$\theta \text{Elev}=\sin^{-1}(t/r)+\theta \text{err}$$

When the angle by the height t and the distance r is equal to or less than the half of the value of the formula of Math. 10, the threshold value in the negative direction is replaced by the following formula.

$$\sin^{-1}(t/r)+\theta \text{err}$$

That is, the following formula of Math. 11 is established.

$$|\theta_{FoV+}| < \frac{1}{2} \times \min_{\theta_{ele}} \left| \sin^{-1}\left( \frac{-1}{N_{ant} \cdot n} + \sin\theta_{ele} \right) - \theta_{ele} \right| \qquad \text{[Math. 11]}$$

$$|\theta_{FoV-}| < \begin{cases} \frac{1}{2} \times \min_{\theta_{ele}} \left| \sin^{-1}\left( \frac{-1}{N_{ant} \cdot n} + \sin\theta_{ele} \right) - \theta_{ele} \right|, \text{ if} \\ \qquad \frac{1}{2} \times \min_{\theta_{ele}} \left| \sin^{-1}\left( \frac{-1}{N_{ant} \cdot n} + \sin\theta_{ele} \right) - \theta_{ele} \right| < \sin^{-1}\left( \frac{t}{r} \right) + \theta_{err} \\ \sin^{-1}\left( \frac{t}{r} \right) + \theta_{err}, \text{ if } \frac{1}{2} \times \min_{\theta_{ele}} \left| \sin^{-1}\left( \frac{-1}{N_{ant} \cdot n} + \sin\theta_{ele} \right) - \theta_{ele} \right| \ge \sin^{-1}\left( \frac{t}{r} \right) + \theta_{err} \end{cases}$$

Here, $\theta_{FoV+}$ is a vertical angle threshold value above (in the forward direction) a mounting center line of the speed detection apparatus (radar) in a vertical direction, $\theta_{FoV-}$ is a vertical angle threshold value below (in the negative direction) the mounting center line of the speed detection apparatus (radar) in the vertical direction, and the sum of $\theta_{FoV+}$ and $\theta_{FoV-}$ is the entire width of FoV in the vertical direction.

t is a mounting height of the speed detection apparatus in the vertical direction, r is a detection distance of the speed detection apparatus, and $\theta_{err}$ is a mounting angle error of the speed detection apparatus.

In the speed detection apparatus according to this embodiment, the speed determination unit may set the vertical angle threshold range with a value within a range that satisfies the formula of Math. 11. For example, a table in which a plurality of vertical angle threshold ranges is registered corresponding to a plurality of distances from the transmission antenna array 220 so as to satisfy the formula of Math. 11 may be prepared, and the speed determination unit may dynamically calculate the vertical angle threshold range on the basis of the table in which a plurality of vertical angle threshold range is registered corresponding to a plurality of distances from the transmission antenna array.

3. Modified Example

Variations of modified examples of this embodiment will be given. This embodiment is appliable to both the TDM-MIMO (time division MIMO) and BPM-MIMO (phase division MIMO). This embodiment is applicable to a case where a transmission antenna array and a reception antenna array constitute a vertical MIMO array. This embodiment is applicable to a two-dimensional MIMO. The arrival angle estimation can be performed by FFT (fast Fourier transformation) and DFT (discrete Fourier transformation). The arrival angle estimation can be performed by CAPON, MUSIC, ESPRIT, or compression sensing.

For example, as an Example, a vertical MIMO array, TDM-MIMO, and arrival angle estimation by FFT may be combined. As another modified example, a vertical MIMO array, BPM-MIMO, and arrival angle estimation by FFT may be combined. As a modified example, a vertical MIMO array, TDM-MIMO, and arrival angle estimation by CAPON, MUSIC, ESPRIT, or compression sensing may be combined. As another modified example, a vertical MIMO array, BPM-MIMO, and arrival angle estimation by CAPON, MUSIC, ESPRIT, or compression sensing may be combined.

4. Brief Summary

The speed range in a typical equidistant MIMO is realistically limited to approximately ±100 km/h. However, in actual use, a minimum speed range of approximately ±200 km/h is required even on Japanese roads (assuming a scene where the own vehicle and an oncoming vehicle are travelling at 100 km/h on a highway). On the other hand, in accordance with this embodiment, it is possible to expand the observable speed to be wider than the speed range of the equidistant MIMO.

In a typical technology, since the intervals for transmitting chirp signals are equal intervals, the phase difference of the speed and the phase difference of the height cannot be distinguished from each other even in the case of trying to expand the speed by the technology described above in the vertical MIMO with equal intervals, and the correct speed cannot be determined. That is, the technology described above has a problem that it cannot be applied to the vertical MIMO with equal intervals.

On the other hand, in accordance with this embodiment, the speed expansion is performed (e.g., the speed wrapping is calculated three times of −1, 0, and +1 for the number of transmission antennas Ntx=3), and the height is detected. In the obtained results, the electric power (Intensity (db)) is the same but the height (AoA, Angle of Arrival) greatly differs. In this regard, the vertical arrival angle (height) with the peak in the vertical angle threshold range of the transmission antenna in the vertical direction (vertical angle threshold range) is determined as a true vertical arrival angle (height). The speed corresponding to the vertical arrival angle is determined as a true speed.

Figure 22:
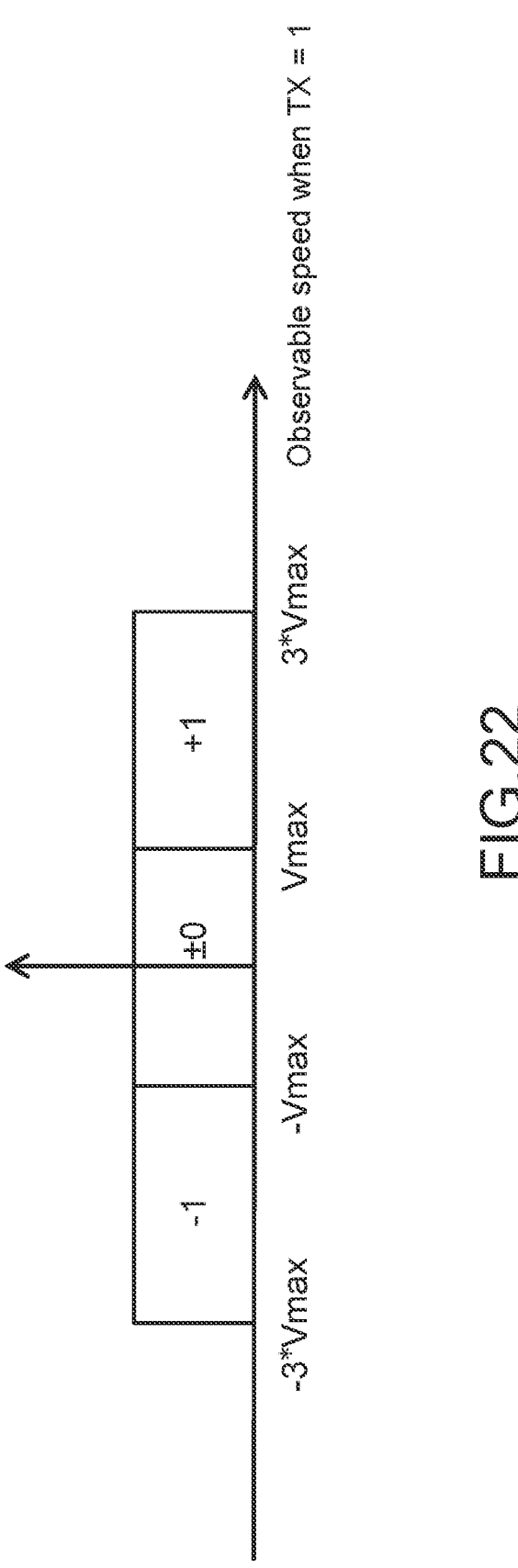
FIG. 22 schematically shows the concept of speed phase correction according to this embodiment.

FIG. 22 schematically shows the concept of speed phase correction according to this embodiment.

In accordance with this embodiment, for the speed range in which the height can be originally detected only up to +Vmax, it is possible to expand the speed range by the amount of the number of transmission antennas x the number of speed wraps. For example, when the number of transmission antennas Ntx=3, three types of speed wrapping of −1, ±0, and +1 are allowed. For this reason, it is possible to expand the speed range from ±Vmax to ±3×Vmax. As a result, it is possible to recover, by the amount corresponding to the number as the number of transmission antennas N, the observable speed that is originally narrowed by the number of transmission antennas N. For this reason, this embodiment is applicable also to the vertical MIMO with substantially equal intervals.

5. Configuration of this Embodiment

Figure 23:
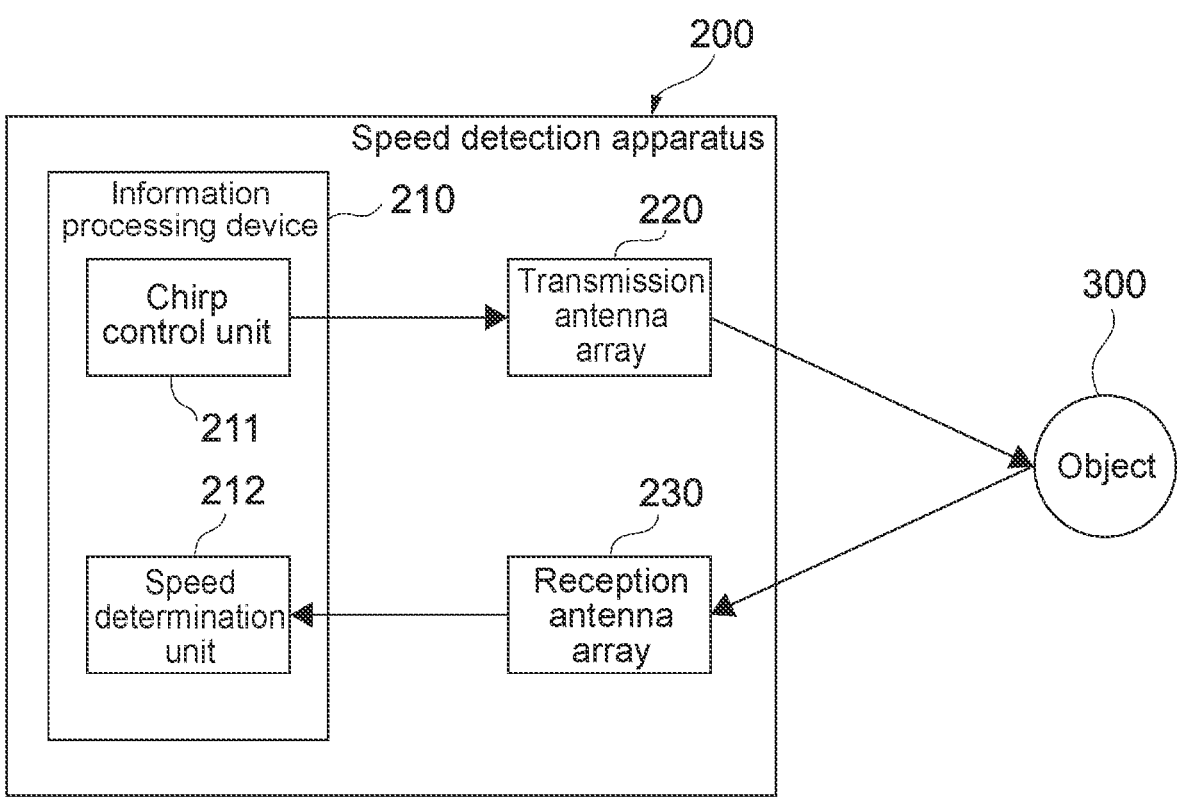
FIG. 23 is a block diagram showing a configuration of a speed detection apparatus according to this embodiment.

FIG. 23 is a block diagram showing a configuration of a speed detection apparatus according to this embodiment.

A speed detection apparatus 200 includes an information processing device 210, a transmission antenna array 220, and a reception antenna array 230. The information processing device 210 operates as a chirp control unit 211 and a speed determination unit 212 when a CPU loads an information processing program stored in a ROM into a RAM and executes the program.

The transmission antenna array 220 and the reception antenna array 230 constitute a vertical MIMO array with equal intervals. The transmission antenna array 220 includes a plurality of transmission antennas, each of which transmits a plurality of chirp signals. That is, the transmission antenna array 220 transmits a plurality of chirp signals multiplexed between a plurality of transmission antennas arranged in the vertical direction. The reception antenna array 230 includes a plurality of reception antennas that receives a plurality of chirp signals reflected by the object 300.

The chirp control unit 211 controls the plurality of chirp signals transmitted from the plurality of transmission antennas such that when the plurality of chirp signals multiplexed between a plurality of transmission antennas is separated for each of the plurality of transmission antennas, intervals between the plurality of chirp signals from the same transmission antenna are equal and a plurality of intervals between the plurality of chirp signals from different transmission antennas are equal. The chirp control unit 211 multiplexes the plurality of chirp signals between the plurality of transmission antennas by time division or phase division.

The speed determination unit 212 calculates a plurality of speed candidates on the basis of the plurality of chirp signals received by the reception antenna array 230. The number of the plurality of transmission antennas that transmits a plurality of chirp signals to be used for vertical arrival angle estimation and the number of the plurality of speed candidates are equal to each other. The speed determination unit 212 determines whether or not a plurality of vertical arrival angle estimation values corresponding to the plurality of speed candidates is included in a vertical angle threshold range, and determines, on the basis of the determination result, one speed candidate from the plurality of speed candidates as a true speed. The speed determination unit 212 determines, as a true vertical arrival angle, one vertical arrival angle estimation value included in the vertical angle threshold range. The speed determination unit 212 determines, as a true speed, one speed candidate corresponding to one vertical arrival angle estimation value included in the vertical angle threshold range.

The speed determination unit 212 dynamically calculates the vertical angle threshold range on the basis of the number of and intervals between the plurality of transmission antennas that transmits the plurality of chirp signals and the distance from the transmission antenna array 220. Specifically, the speed determination unit 212 may dynamically calculates the vertical angle threshold range on the basis of the table in which a plurality of vertical angle threshold range is registered corresponding to a plurality of distances from the transmission antenna array 220. The speed determination unit may dynamically calculate the vertical angle threshold range on the basis of the mounting height of the speed detection apparatus 200 in the vertical direction.

The speed determination unit 212 performs arrival angle estimation by fast Fourier transform (FFT) or discrete Fourier transform (DFT). The speed determination unit 212 performs arrival angle estimation by CAPON, MUSIC, ESPRIT, or compression sensing.

The speed detection apparatus 200 according to this embodiment or the information processing device 210 excluding the transmission antenna array 220 and the reception antenna array 230 can be applied to a vehicle control system 11.

6. Configuration of Vehicle

Figure 24:
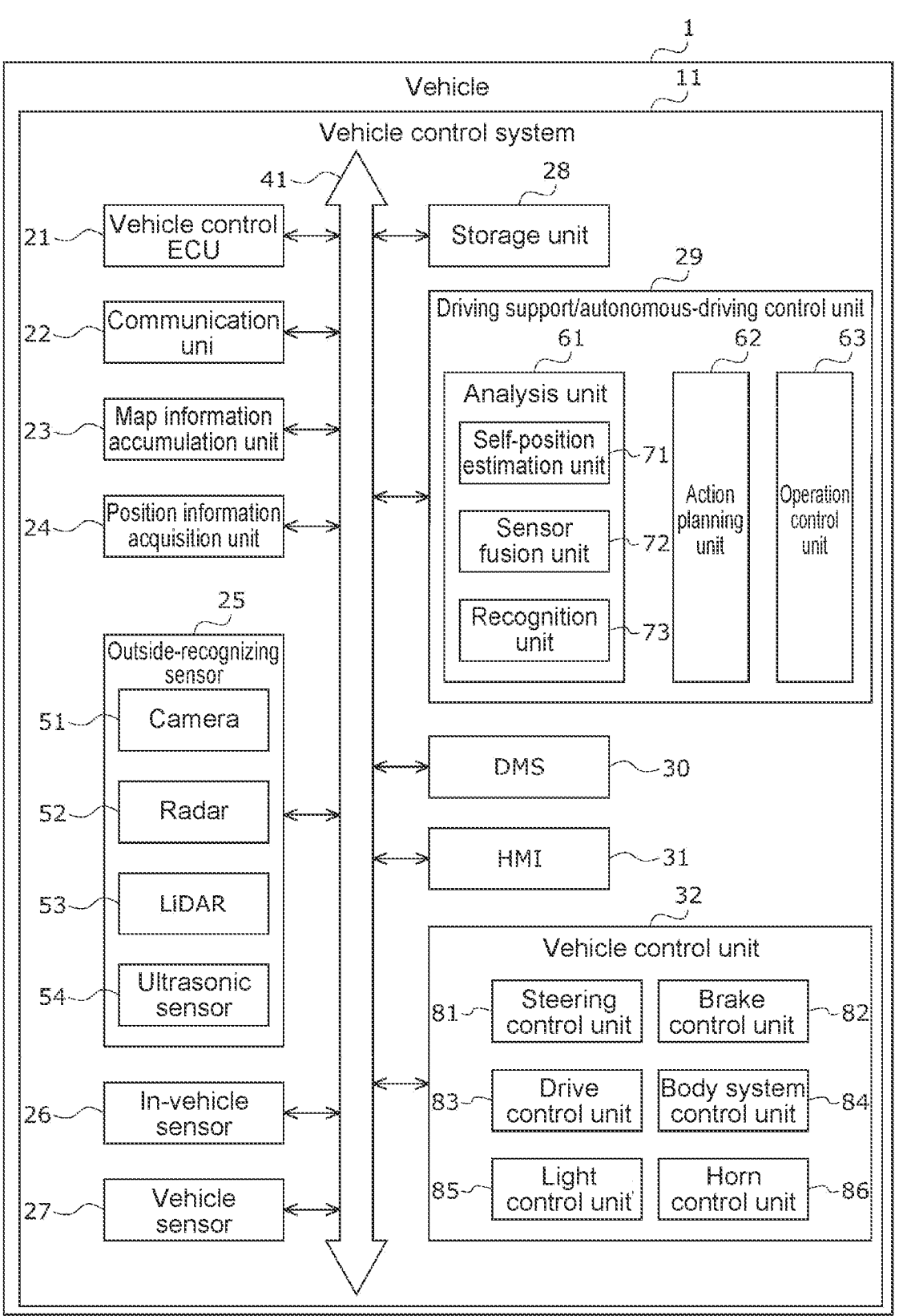
FIG. 24 is a block diagram showing a configuration example of a vehicle control system.

FIG. 24 is a block diagram showing a configuration example of the vehicle control system 11 that is an example of a moving device control system to which the present technology is applied.

The vehicle control system 11 is provided in a vehicle 1 and performs processing relating to driving support and automated driving of the vehicle 1.

The vehicle control system 11 includes a vehicle control ECU (Electronic Control Unit) 21, a communication unit 22, a map information accumulation unit 23, a position information acquisition unit 24, an outside-recognizing sensor 25, an in-vehicle sensor 26, a vehicle sensor 27, a storage unit 28, a driving support/automated-driving control unit 29, a DMS (Driver Monitoring System) 30, an HMI (Human Machine Interface) 31, and a vehicle control unit 32.

The vehicle control ECU (Electronic Control Unit) 21, the communication unit 22, the map information accumulation unit 23, the position information acquisition unit 24, the outside-recognizing sensor 25, the in-vehicle sensor 26, the vehicle sensor 27, the storage unit 28, the driving support/automated-driving control unit 29, the driver monitoring system (DMS) 30, the human machine interface (HMI) 31, and the vehicle control unit 32 are communicably connected to each other via a communication network 41. The communication network 41 includes an in-vehicle communication network, a bus, or the like conforming to the digital bidirectional communication standard such as a CAN (Controller Area Network), a LIN (Local Interconnect Network), a LAN (Local Area Network), FlexRay (registered trademark), and Ethernet (registered trademark). The communication network 41 may be used properly depending on the type of data to be transmitted. For example, CAN may be applied for data relating to vehicle control and Ethernet may be applied for large-capacity data. Note that the respective units of the vehicle control system 11 are directly connected to each other using wireless communication assuming relatively short-distance communication, such as near field communication (NFC) and Bluetooth (registered trademark) without the communication network 41 in some cases.

Note that hereinafter, in the case where the respective units of the vehicle control system 11 communicate with each other via the communication network 41, description of the communication network 41 will be omitted. For example, in the case where the vehicle control ECU 21 and the communication unit 22 communicate with each other via the communication network 41, it is described that the vehicle control ECU 21 and the communication unit 22 are communicated with each other.

The vehicle control ECU 21 includes various processors such as a CPU (Central Processing Unit) and an MPU (Micro Processing Unit). The vehicle control ECU 21 controls the functions of the entire vehicle control system 11 or part thereof.

The communication unit 22 communicates with various devices inside and outside the vehicle, another vehicle, a server, a base station, and the like, and transmits/receives various types of data. At this time, the communication unit 22 is capable of performing communication using a plurality of communication methods.

The communication with the outside, which can be executed by the communication unit 22, will be schematically described. The communication unit 22 communicates with a server present on an external network (hereinafter, referred to as the external server) or the like via a base station or an access point by a wireless communication method such as 5G (5th generation mobile communication system), LTE (Long Term Evolution), and DSRC (Dedicated Short Range Communications). The external network with which the communication unit 22 communicates is, for example, the Internet, a cloud network, or a network unique to a business operator. The communication method of the communication performed by the communication unit 22 with the external network is not particularly limited as long as it is a wireless communication method capable of performing digital bidirectional communication at a predetermined communication speed or more and a predetermined distance or more.

Further, for example, the communication unit 22 is capable of communicating with a terminal present in the vicinity of the own vehicle using a P2P (Peer To Peer) technology. The terminal present in the vicinity of the own vehicle is, for example, a terminal worn by a moving object that moves at a relatively low speed such as a pedestrian and a bicycle, a terminal installed at a fixed position in a store or the like, or an MTC (Machine Type Communication) terminal. Further, the communication unit 22 is capable of performing V2X communication. The V2X communication is communication between the own vehicle and others such as vehicle-to-vehicle communication with another vehicle, vehicle-to-infrastructure communication with a roadside device or the like, vehicle-to-home communication with a home, and vehicle-to-pedestrian communication with a terminal owned by a pedestrian.

The communication unit 22 is capable of receiving, from the outside, a program for updating software that controls the operation of the vehicle control system 11, for example (Over The Air). The communication unit 22 is capable of further receiving, from the outside, map information, traffic information, information around the vehicle 1, and the like. Further, for example, the communication unit 22 is capable of transmitting, to the outside, information relating to the vehicle 1 or information around the vehicle 1. Examples of the information relating to the vehicle 1 transmitted by the communication unit 22 to the outside include data indicating the state of the vehicle 1 and the recognition result by a recognition unit 73. Further, for example, the communication unit 22 performs communication corresponding to the vehicle emergency call system such as ecall.

For example, the communication unit 22 receives electromagnetic waves transmitted by vehicle information and communication system (VICS) (registered trademark) including a radio wave beacon, an optical beacon, and FM multiplex broadcasting.

The in-vehicle communication that can be executed by the communication unit 22 will be schematically described. The communication unit 22 is capable of communicating with each device in the vehicle using, for example, wireless communication. The communication unit 22 is capable of performing wireless communication with the device in the vehicle by a communication method capable of performing digital bidirectional communication at a predetermined communication speed or more by wireless communication such as a wireless LAN, Bluetooth, NFC, and WUSB (Wireless USB). The present disclosure is not limited thereto, and the communication unit 22 is capable of communicating with each device in the vehicle using wired communication. For example, the communication unit 22 is capable of communicating with each device in the vehicle by wired communication via a cable connected to a connection terminal (not shown). The communication unit 22 is capable of communicating with each device in the vehicle by a communication method capable of performing digital bidirectional communication at a predetermined communication speed or more by wired communication such as USB (Universal Serial Bus), HDMI (registered trademark) (High-Definition Multimedia Interface), and MHL (Mobile High-definition Link).

Here, the device in the vehicle represents, for example, a device that is not connected to the communication network 41 in the vehicle. As the device in the vehicle, for example, a mobile device or wearable device owned by a passenger such as a driver, an information device that is brought into the vehicle and temporarily installed, and the like are assumed.

The map information accumulation unit 23 accumulates one or both of the map acquired from the outside and the map created by the vehicle 1. For example, the map information accumulation unit 23 accumulates a three-dimensional high-precision map, a global map that has precision lower than that of the high-precision map but covers a wider area, and the like.

The high-precision map is, for example, a dynamic map, a point cloud map, or a vector map. The dynamic map is, for example, a map including four layers of dynamic information, quasi-dynamic information, quasi-static information, and static information, and is provided from the external server or the like to the vehicle 1. The point cloud map is a map including point clouds (point cloud data). The vector map is, for example, a map conforming to ADAS (Advanced Driver Assistance System) or AD (Autonomous Driving), in which traffic information such as lanes and positions of traffic lights is associated with a point cloud map.

The point cloud map and the vector map may be provided from, for example, the external server, or may be created by the vehicle 1 on the basis of the sensing result by a camera 51, a radar 52, a LiDAR 53, and the like as a map for matching with a local map described below and accumulated in the map information accumulation unit 23. Further, in the case where a high-precision map is provided from the external server or the like, for example, map data of several hundred meters square relating to the planned route through which the vehicle 1 will travel is acquired from the external server or the like in order to reduce the communication capacity.

The position information acquisition unit 24 receives a GNSS signal from a GNSS (Global Navigation Satellite System) satellite to acquire position information of the vehicle 1. The received position information is supplied to the driving support/automated-driving control unit 29. Note that the position information acquisition unit 24 does not necessary use the method using a GNSS signal and may acquire position information using a beacon, for example.

The outside-recognizing sensor 25 includes various sensors used for recognizing the external situation of the vehicle 1 and supplies sensor data from each sensor to the respective units of the vehicle control system 11. The type and number of the sensors included in the outside-recognizing sensor 25 are arbitrary.

For example, the outside-recognizing sensor 25 includes the camera 51, the radar 52, the LiDAR (Light Detection and Ranging, Laser Imaging Detection and Ranging) 53, and an ultrasonic sensor 54. The present disclosure is not limited thereto, and the outside-recognizing sensor 25 may include one or more of sensors of the camera 51, the radar 52, the LiDAR 53, and the ultrasonic sensor 54. The numbers of cameras 51, radars 52, LiDARs 53, and ultrasonic sensors 54 are not particularly limited as long as they can be practically installed in the vehicle 1. Further, the type of the sensor included in the outside-recognizing sensor 25 is not limited to this example, and the outside-recognizing sensor 25 may include other types of sensors. An example of the sensing region of each sensor included in the outside-recognizing sensor 25 will be described below.

Note that the imaging method of the camera 51 is not particularly limited. For example, as the camera 51, a camera of various imaging methods capable of performing distance measurement, such as a ToF (Time Of Flight) camera, a stereo camera, a monocular camera, and an infrared camera, can be applied as necessary. The present disclosure is not limited thereto, and the camera 51 does not necessarily perform distance measurement and may be for simply acquiring a captured image.

Further, for example, the outside-recognizing sensor 25 may include an environment sensor for detecting the environment for the vehicle 1. The environment sensor is a sensor for detecting the environment including weather, climate, and brightness, and may include various sensors such as a raindrop sensor, a fog sensor, a sunshine sensor, a snow sensor, and an illuminance sensor.

Further, for example, the outside-recognizing sensor 25 includes a microphone used for, for example, detecting sound around the vehicle 1 and the position of the sound source.

The in-vehicle sensor 26 includes various sensors for detecting in-vehicle information, and supplies sensor data from each sensor to the respective units of the vehicle control system 11. The type and number of various sensors included in the in-vehicle sensor 26 are not particularly limited as long as they can be practically installed in the vehicle 1.

For example, the in-vehicle sensor 26 may include one or more sensors of a camera, a radar, a seating sensor, a steering wheel sensor, a microphone, and a biosensor. As the camera included in the in-vehicle sensor 26, for example, a camera of various imaging methods capable of performing distance measurement, such as a ToF camera, a stereo camera, a monocular camera, and an infrared camera, can be used. The present disclosure is not limited thereto, and the camera included in the in-vehicle sensor 26 does not necessarily perform distance measurement and may be for simply acquiring a captured image. The biosensor included in the in-vehicle sensor 26 is provided on, for example, a seat or a steering wheel, and detects various types of biometric information of a passenger such as the driver.

The vehicle sensor 27 includes various sensors for detecting the state of the vehicle 1 and supplies sensor data from each sensor to the respective units of the vehicle control system 11. The type and number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) that integrates them. For example, the vehicle sensor 27 includes a steering angle sensor that detects the steering angle of a steering wheel, a yaw rate sensor, an accelerator sensor that detects the amount of operation of an accelerator pedal, and a brake sensor that detects the amount of operation of a brake pedal. For example, the vehicle sensor 27 includes a rotation sensor that detects the RPM of an engine or a motor, a pneumatic sensor that detects a tire pressure, a slip rate sensor that detects the slip rate of a tire, and a wheel speed sensor that detects the rotation speed of a wheel. For example, the vehicle sensor 27 includes a battery sensor that detects the remaining amount and temperature of a battery and an impact sensor that detects the impact from the outside.

The storage unit 28 includes at least one of a non-volatile storage medium or a volatile storage medium, and stores data and a program. The storage unit 28 is used as, for example, an EEPROM (Electrically Erasable Programmable Read Only Memory) and a RAM (Random Access Memory). As a storage medium, a magnetic storage device such as an HDD (Hard Disc Drive), a semiconductor storage device, an optical storage device, and a magneto-optical storage device are applicable. The storage unit 28 stores various programs and data used by the respective units of the vehicle control system 11. For example, the storage unit 28 includes an EDR (Event Data Recorder) and a DSSAD (Data Storage System for Automated Driving), and stores information regarding the vehicle 1 before and after an event such as an accident and information acquired by the in-vehicle sensor 26.

The driving support/automated-driving control unit 29 controls driving support and automated driving of the vehicle 1. For example, the driving support/automated-driving control unit 29 includes an analysis unit 61, an action planning unit 62, and an operation control unit 63.

The analysis unit 61 performs processing of analyzing the vehicle 1 and the surrounding situation. The analysis unit 61 includes a self-position estimation unit 71, a sensor fusion unit 72, and the recognition unit 73.

The self-position estimation unit 71 estimates the self-position of the vehicle 1 on the basis of the sensor data from the outside-recognizing sensor 25 and the high-precision map accumulated in the map information accumulation unit 23. For example, the self-position estimation unit 71 generates a local map on the basis of the sensor data from the outside-recognizing sensor 25, and matches the local map with the high-precision map to estimate the self-position of the vehicle 1. The position of the vehicle 1 is based on, for example, the center of the rear wheel-to-axle.

The local map is, for example, a three-dimensional high-precision map or an occupancy grid map created using a technology such as SLAM (Simultaneous Localization and Mapping). The three-dimensional high-precision map is, for example, the above-mentioned point cloud map. The occupancy grid map is a map that is obtained by dividing a three-dimensional or two-dimensional space around the vehicle 1 into grids of a predetermined size and shows the occupied state of an object in units of grids. The occupied state of an object is shown by, for example, the presence or absence of the object or the probability of presence. The local map is also used by, for example, the recognition unit 73 for detecting and recognizing the external situation of the vehicle 1.

Note that the self-position estimation unit 71 may estimate the self-position of the vehicle 1 on the basis of the position information acquired by the position information acquisition unit 24 and the sensor data from the vehicle sensor 27.

The sensor fusion unit 72 performs sensor fusion processing of acquiring new information by combining a plurality of different types of sensor data (e.g., the image data supplied from the camera 51 and the sensor data supplied from the radar 52). Examples of the method of combining different types of sensor data include integration, fusion, and association.

The recognition unit 73 executes detection processing of detecting the external situation of the vehicle 1 and recognition processing of recognizing the external situation of the vehicle 1.

For example, the recognition unit 73 performs the detection processing and recognition processing of the external situation of the vehicle 1 on the basis of information from the outside-recognizing sensor 25, information from the self-position estimation unit 71, information from the sensor fusion unit 72, or the like.

Specifically, for example, the recognition unit 73 performs detection processing and recognition processing of an object around the vehicle 1. The detection processing of an object is, for example, processing of detecting the presence or absence of an object, or the size, shape, position, and movement of the object. The recognition processing of an object is, for example, processing of recognizing the attribute of an object such as a type or identifying a specific object. However, the detection processing and the recognition processing are not necessarily clearly separated from each other and overlap with each other in some cases.

For example, the recognition unit 73 detects an object around the vehicle 1 by performing clustering for classifying point clouds based on the sensor data acquired by the radar 52, the LiDAR 53, or the like into each block of point clouds. As a result, the presence or absence of an object around the vehicle 1, and the size, shape, and position of the object are detected.

For example, the recognition unit 73 detects the movement of an object around the vehicle 1 by performing tracking for following the movement of the block of point clouds classified by the clustering. As a result, the speed and the traveling direction (movement vector) of the object around the vehicle 1 are detected.

For example, the recognition unit 73 detects or recognizes, on the basis of the image data supplied from the camera 51, a vehicle, a person, a bicycle, an obstacle, a structure, a road, a traffic light, a traffic sign, a road sign, and the like. Further, the type of an object around the vehicle 1 may be recognized by performing recognition processing such as semantic segmentation.

For example, the recognition unit 73 is capable of performing processing of recognizing traffic rules around the vehicle 1 on the basis of the map accumulated in the map information accumulation unit 23, the estimation result of the self-position by the self-position estimation unit 71, and the recognition result of an object around the vehicle 1 by the recognition unit 73. The recognition unit 73 is capable of recognizing, by this processing, the position and state of the traffic light, the content of the traffic sign and road sign, the content of the traffic regulation, the lane in which the vehicle is capable of travelling, and the like.

For example, the recognition unit 73 is capable of performing recognition processing of the surrounding environment of the vehicle 1. As the surrounding environment to be recognized by the recognition unit 73, the weather, temperature, humidity, brightness, the state of a road surface, and the like are assumed.

The action planning unit 62 creates an action plan of the vehicle 1. For example, the action planning unit 62 creates an action plan by performing processing of route planning and route tracking.

Note that the route planning (Global path planning) is processing of planning a rough route from a start to a goal. This route planning includes also processing of trajectory generation (Local path planning) called trajectory planning, the vehicle 1 being capable of safely and smoothly traveling through the trajectory in the vicinity of the vehicle 1 in the route planned in the route planning considering the kinetic characteristics of the vehicle 1.

The route tracking is processing of planning an operation for safely and accurately traveling on a route planned by the route planning within a planned time. The action planning unit 62 is capable of, for example, calculating the target speed and the target angular velocity of the vehicle 1 on the basis of the result of the route tracking processing.

The operation control unit 63 controls the operation of the vehicle 1 in order to realize the action plan created by the action planning unit 62.

For example, the operation control unit 63 controls a steering control unit 81, a brake control unit 82, and a drive control unit 83 included in the vehicle control unit 32 described below to perform acceleration/deceleration control and direction control such that the vehicle 1 travels through the trajectory calculated by the trajectory planning. For example, the operation control unit 63 performs coordination control for the purpose of realizing the functions of ADAS, such as collision avoidance, impact mitigation, follow-up driving, vehicle-speed maintaining driving, collision warning of the own vehicle, and lane deviation warning of the own vehicle. For example, the operation control unit 63 performs coordination control for the purpose of automated driving for automatedly traveling without an operation of the driver.

The DMS 30 performs authentication processing of the driver, recognition processing of the state of the driver, and the like, on the basis of the sensor data from the in-vehicle sensor 26, the input data input to the HMI 31 described below, and the like. As the state of the driver to be recognized, for example, the physical condition, the degree of alertness, the degree of concentration, the degree of fatigue, the gaze direction, the degree of drunkenness, the driving operation, and the posture are assumed.

Note that the DMS 30 may perform the authentication processing of a passenger other than the driver and the recognition processing of the state of the passenger. Further, for example, the DMS 30 may perform the recognition processing of the situation in the vehicle on the basis of the sensor data from the in-vehicle sensor 26. As the situation in the vehicle to be recognized, for example, temperature, humidity, brightness, odor, and the like are assumed.

The HMI 31 inputs various types of data and instructions, and presents various types of data to the driver and the like.

The input of data by the HMI 31 will be schematically described. The HMI 31 includes an input device for a person to input data. The HMI 31 generates an input signal on the basis of the data and instruction input by the input device, and supplies the input signal to the respective units of the vehicle control system 11. The HMI 31 includes, as an input device, an operator such as a touch panel, a button, a switch, and a lever. The present disclosure is not limited thereto, and the HMI 31 may further include an input device capable of inputting information by a method other than the manual operation, e.g., voice or gesture. Further, for example, the HMI 31 may use, as an input device, a remote control device using infrared rays or radio waves, or an externally-connected device such as a movable device and a wearable device that support the operation of the vehicle control system 11.

The presentation of data by the HMI 31 will be schematically described. The HMI 31 generates visual information, auditory information, and haptic information for a passenger or the outside of the vehicle. Further, the HMI 31 performs output control of controlling the output, the output content, the output timing, and the output method of these pieces of generated information. The HMI 31 generates and outputs, as the visual information, an image or information indicated by light such as an operation screen, the state display of the vehicle 1, warning display, and a monitor image indicating the situation around the vehicle 1. Further, the HMI 31 generates and outputs, as the auditory information, information indicated by sounds such as voice guidance, a warning sound, and a warning message. Further, the HMI 31 generates and outputs, as the haptic information, information given to the haptic sensation of a passenger by, for example, force, vibration, or movement.

As the output device by which the HMI 31 outputs the visual information, for example, a display device that presents visual information by displaying an image by itself or a projector device that presents visual information by projecting an image can be applied. Note that the display device does not necessarily need to be a display device including a normal display and may be a device that displays visual information within the field of view of a passenger, such as a head-up display, a transmissive display, and a wearable device having an AR (Augmented Reality) function. Further, the HMI 31 may use, as an output device that outputs visual information, a display device included in a navigation device, an instrument panel, a CMS (Camera Monitoring System), an electronic mirror, a lamp, or the like provided in the vehicle 1.

As an output device by which the HMI 31 outputs auditory information, for example, an audio speaker, a headphone, or an earphone can be applied.

As an output device by which the HMI 31 outputs haptic information, for example, a haptic device using a haptic technology can be applied. The haptic device is provided at a portion of the vehicle 1 that a passenger touches, such as a steering wheel and a seat.

The vehicle control unit 32 controls the respective units of the vehicle 1. The vehicle control unit 32 includes the steering control unit 81, the brake control unit 82, the drive control unit 83, a body system control unit 84, a light control unit 85, and a horn control unit 86.

The steering control unit 81 detects and controls the state of the steering system of the vehicle 1, for example. The steering system includes, for example, a steering mechanism including a steering wheel and the like, an electric power steering, and the like. The steering control unit 81 includes, for example, a steering ECU that controls the steering system, an actuator that drives the steering system, and the like.

The brake control unit 82 detects and controls the state of the brake system of the vehicle 1, for example. The brake system includes, for example, a brake mechanism including a brake pedal and the like, an ABS (Antilock Brake System), a regenerative brake mechanism, and the like. The brake control unit 82 includes, for example, a brake ECU that controls the brake system, an actuator that drives the brake system, and the like.

The drive control unit 83 detects and controls the state of the drive system of the vehicle 1, for example. The drive system includes, for example, a drive-force generating device for generating a drive force, such as an accelerator pedal, an internal combustion engine, and a drive motor, a drive-force transmission mechanism for transmitting a drive force to wheels, and the like. The drive control unit 83 includes, for example, a drive ECU that controls the drive system, an actuator that drives the drive system, and the like.

The body system control unit 84 detects and controls the state of the body system of the vehicle 1, for example. The body system includes, for example, a keyless entry system, a smart key system, a power window device, a power seat, an air conditioner, an airbag, a seat belt, a shift lever, and the like. The body system control unit 84 includes, for example, a body system ECU that controls the body system, an actuator that drives the body system, and the like.

The light control unit 85 detects and controls the state of various lights of the vehicle 1. As the light to be controlled, for example, a headlight, a backlight, a fog light, a turn signal, a brake light, a projection, a bumper display, and the like are assumed. The light control unit 85 includes a light ECU that controls the light, an actuator that drives the light, and the like.

The horn control unit 86 detects and controls the state of a car horn of the vehicle 1, for example. The horn control unit 86 includes, for example, a horn ECU that controls the car horn, an actuator that drives the car horn, and the like.

Figure 25:
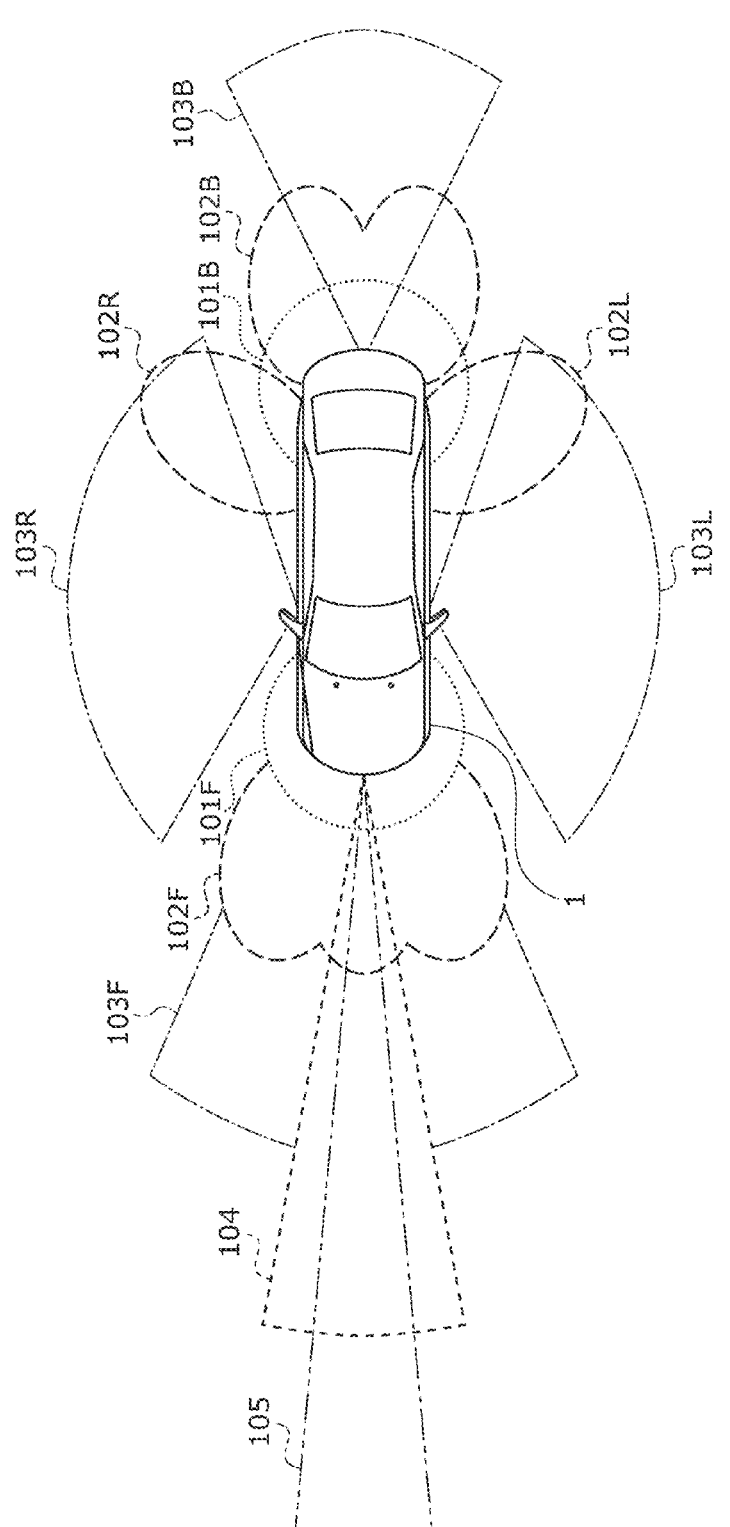
FIG. 25 is a diagram showing an example of a sensing region.

FIG. 25 is a diagram showing an example of a sensing region of the camera 51, the radar 52, the LIDAR 53, the ultrasonic sensor 54, and the like of the outside-recognizing sensor 25 shown in FIG. 24. Note that in FIG. 25, a state of the vehicle 1 viewed from the upper surface is schematically shown, the left end side is the front end (front) side of the vehicle 1, and the right end side is the rear end (rear) side of the vehicle 1.

A sensing region 101F and a sensing region 101B each show an example of the sensing region of the ultrasonic sensor 54. The sensing region 101F covers the periphery of the front end of the vehicle 1 by the plurality of ultrasonic sensors 54. The sensing region 101B covers the periphery of the rear end of the vehicle 1 by the plurality of ultrasonic sensors 54.

The sensing results in the sensing region 101F and the sensing region 101B are used for, for example, parking support of the vehicle 1.

A sensing region 102F to a sensing region 102B each show an example of the sensing region of the radar 52 for a short distance or middle distance. The sensing region 102F covers a range to a position farther than the sensing region 101F in front of the vehicle 1. The sensing region 102B covers a range to a position farther than the sensing region 101B behind the vehicle 1. The sensing region 102L covers the rear periphery of the vehicle 1 on the left side surface. The sensing region 102R covers the rear periphery of the vehicle 1 on the right side surface.

The sensing result in the sensing region 102F is used for, for example, detecting a vehicle or a pedestrian present in front of the vehicle 1. The sensing result in the sensing region 102B is used for, for example, a function of preventing collision behind the vehicle 1. The sensing results in the sensing region 102L and the sensing region 102R are used for, for example, detecting an object in a blind spot on the side of the vehicle 1.

A sensing region 103F to a sensing region 103B each show an example of the sensing region of the camera 51. The sensing region 103F covers a range to a position farther than the sensing region 102F in front of the vehicle 1. The sensing region 103B covers a range to a position farther than the sensing region 102B behind the vehicle 1. The sensing region 103L covers the periphery of the vehicle 1 on the left side surface. The sensing region 103R covers the periphery of the vehicle 1 on the right side surface.

The sensing result in the sensing region 103F can be used for, for example, recognition of a traffic light and a traffic sign, a lane deviation prevention support system, or an automatic headlight control system. The sensing result in the sensing region 103B can be used for, for example, parking support and a surround view system. The sensing results in the sensing region 103L and the sensing region 103R can be used for, for example, a surround view system.

A sensing region 104 shows an example of the sensing region of the LiDAR 53. The sensing region 104 covers a range to a position farther than the sensing region 103F in front of the vehicle 1. Meanwhile, the sensing region 104 has a narrower range in the right and left direction than the sensing region 103F.

The sensing result in the sensing region 104 is used for, for example, detecting an object such as a peripheral vehicle.

A sensing region 105 shows an example of the sensing region of the radar 52 for a long distance. The sensing region 105 covers a range to a position farther than the sensing region 104 in front of the vehicle 1. Meanwhile, the sensing region 105 has a narrower range in the right and left direction than the sensing region 104.

The sensing result in the sensing region 105 is used for, for example, ACC (Adaptive Cruise Control), emergency brake, collision avoidance.

Note that the sensing region of each sensor of the camera 51, the radar 52, the LiDAR 53, and the ultrasonic sensor 54 included in the outside-recognizing sensor 25 may have various configurations other than that shown in FIG. 25. Specifically, the ultrasonic sensor 54 may sense also the side of the vehicle 1, or the LiDAR 53 may sense the rear of the vehicle 1. Further, the installation position of each sensor is not limited to each of the above-mentioned examples. Further, the number of sensors may be one or two or more.

The present disclosure may also have the following configurations.

(1) A speed detection apparatus, including:

a transmission antenna array that transmits a plurality of chirp signals multiplexed between a plurality of transmission antennas arranged in a vertical direction;

a reception antenna array that includes a plurality of reception antennas receiving the plurality of chirp signals that has been reflected; and a speed determination unit that calculates a plurality of speed candidates on the basis of the plurality of chirp signals received by the reception antenna array, determines whether or not a plurality of vertical arrival angle estimation values corresponding to the plurality of speed candidates falls within a vertical angle threshold range, and determines, as a true speed, one speed candidate from the plurality of speed candidates on the basis of a determination result.

(2) The speed detection apparatus according to (1) above, in which the speed determination unit determines, as the true speed, one speed candidate corresponding to one vertical arrival angle estimation value included in the vertical angle threshold range.

(3) The speed detection apparatus according to (1) or (2) above, in which the speed determination unit determines, as a true vertical arrival angle, one vertical arrival angle estimation value included in the vertical angle threshold range.

(4) The speed detection apparatus according to any one of (1) to (3) above, in which the speed determination unit dynamically calculates the vertical angle threshold range on the basis of the number of and intervals between the plurality of transmission antennas that transmits the plurality of chirp signals.

(5) The speed detection apparatus according to any one of (1) to (4) above, in which the speed determination unit dynamically calculates the vertical angle threshold range on the basis of a distance from the transmission antenna array.

(6) The speed detection apparatus according to (5) above, in which the speed determination unit dynamically calculates the vertical angle threshold range on the basis of a table in which a plurality of vertical angle threshold ranges is registered corresponding to a plurality of distances from the transmission antenna array.

(7) The speed detection apparatus according to any one of (1) to (6) above, in which the speed determination unit sets a vertical angle threshold range with a value within a range that satisfies the formula of Math. 10.

(8) The speed detection apparatus according to any one of (1) to (7) above, in which the speed determination unit dynamically calculates the vertical angle threshold range on the basis of a mounting height of the speed detection apparatus in the vertical direction.

(9) The speed detection apparatus according to any one of (1) to (8) above, in which the speed determination unit sets a vertical angle threshold range with a value within a range that satisfies the formula of Math. 11.

(10) The speed detection apparatus according to any one of (1) to (9) above, further including a chirp control unit that controls the plurality of chirp signals transmitted from the plurality of transmission antennas such that when the plurality of chirp signals multiplexed between the plurality of transmission antennas is separated for each of the plurality of transmission antennas, intervals between the plurality of chirp signals from the same transmission antenna are equal and a plurality of intervals between the plurality of chirp signals from different transmission antennas are substantially equal.

(11) The speed detection apparatus according to any one of (1) to (10) above, in which the chirp control unit multiplexes the plurality of chirp signals between the plurality of transmission antennas in time division.

(12) The speed detection apparatus according to any one of (1) to (10) above, in which the chirp control unit multiplexes the plurality of chirp signals between the plurality of transmission antennas in phase division.

(13) The speed detection apparatus according to any one of (1) to (12) above, in which the number of the plurality of transmission antennas that transmits the plurality of chirp signals to be used for vertical arrival angle estimation and the number of the plurality of speed candidates are equal to each other.

(14) The speed detection apparatus according to any one of (1) to (13) above, in which the transmission antenna array and the reception antenna array constitute a vertical MIMO array with substantially equal intervals.

(15) The speed detection apparatus according to any one of (1) to (14) above, in which the speed determination unit performs arrival angle estimation by fast Fourier transform (FFT) or discrete Fourier transform (DFT).

(16) The speed detection apparatus according to any one of (1) to (14) above, in which the speed determination unit performs arrival angle estimation by CAPON, MUSIC, ESPRIT, or compression sensing.

(17) An information processing device, including:

a speed determination unit that calculates a plurality of speed candidates on the basis of a plurality of chirp signals received by a reception antenna array of a speed detection apparatus including a transmission antenna array and the reception antenna array, the transmission antenna array transmitting a plurality of chirp signals multiplexed between a plurality of transmission antennas arranged in a vertical direction, the reception antenna array including a plurality of reception antennas receiving the plurality of chirp signals that has been reflected, and determines whether or not a plurality of vertical arrival angle estimation values corresponding to the plurality of speed candidates falls within a vertical angle threshold range, and determines, as a true speed, one speed candidate from the plurality of speed candidates on the basis of a determination result.

(18) An information processing method, including:

in a speed detection apparatus including a transmission antenna array that transmits a plurality of chirp signals multiplexed between a plurality of transmission antennas arranged in a vertical direction, and a reception antenna array that includes a plurality of reception antennas receiving the plurality of chirp signals that has been reflected, calculating a plurality of speed candidates on the basis of the plurality of chirp signals received by the reception antenna array; and determining whether or not a plurality of vertical arrival angle estimation values corresponding to the plurality of speed candidates falls within a vertical angle threshold range, and determining, as a true speed, one speed candidate from the plurality of speed candidates on the basis of a determination result.

Although embodiments of the present technology and modified examples have been described above, the present technology is not limited only to the above-mentioned embodiments and it goes without saying that various modifications can be made without departing from the essence of the present technology.

REFERENCE SIGNS LIST

200 speed detection apparatus
210 information processing device
211 chirp control unit
212 speed determination unit
220 transmission antenna array
230 reception antenna array

The invention claimed is:

1. A speed detection apparatus, comprising:

a transmission antenna array that transmits a plurality of chirp signals multiplexed between a plurality of transmission antennas arranged in a vertical direction;

a reception antenna array that includes a plurality of reception antennas receiving the plurality of chirp signals that has been reflected; and a speed determination unit that calculates a plurality of speed candidates on a basis of the plurality of chirp signals received by the reception antenna array, determines whether or not a plurality of vertical arrival angle estimation values corresponding to the plurality of speed candidates falls within a vertical angle threshold range, and determines, as a true speed, one speed candidate from the plurality of speed candidates on a basis of a determination result.

2. The speed detection apparatus according to claim 1, wherein the speed determination unit determines, as the true speed, one speed candidate corresponding to one vertical arrival angle estimation value included in the vertical angle threshold range.

3. The speed detection apparatus according to claim 1, wherein the speed determination unit determines, as a true vertical arrival angle, one vertical arrival angle estimation value included in the vertical angle threshold range.

4. The speed detection apparatus according to claim 1, wherein the speed determination unit dynamically calculates the vertical angle threshold range on a basis of the number of and intervals between the plurality of transmission antennas that transmits the plurality of chirp signals.

5. The speed detection apparatus according to claim 1, wherein the speed determination unit dynamically calculates the vertical angle threshold range on a basis of a distance from the transmission antenna array.

6. The speed detection apparatus according to claim 5, wherein the speed determination unit dynamically calculates the vertical angle threshold range on a basis of a table in which a plurality of vertical angle threshold ranges is registered corresponding to a plurality of distances from the transmission antenna array.

7. The speed detection apparatus according to claim 1, wherein the speed determination unit sets a vertical angle threshold range with a value within a range that satisfies the following formula $$\theta_{FoVp-p} = \min_{\theta_{ele}} \left| \sin^{-1}\left(\frac{-1}{N_{ant} \cdot n} + \sin\theta_{ele}\right) - \theta_{ele} \right| \text{ subject to} \qquad \text{[Math. 12]}$$

$$0 \le \theta_{ele} \le \sin^{-1}\left(\frac{1}{N_{ant} \cdot n}\right)$$

$\theta_{FoVp-p}$ being a width of angle threshold values in the vertical direction, $\theta_{ele}$ being a vertical angle value, $N_{ant}$ being the number of the plurality of transmission antennas that transmits the plurality of chirp signals to be used for vertical arrival angle estimation, n being a ratio between an interval between the plurality of transmission antennas in the vertical direction and a wavelength in free space of the chirp signal transmitted by the transmission antenna array.

8. The speed detection apparatus according to claim 1, wherein the speed determination unit dynamically calculates the vertical angle threshold range on a basis of a mounting height of the speed detection apparatus in the vertical direction.

9. The speed detection apparatus according to claim 1, wherein the speed determination unit sets a vertical angle threshold range with a value within a range that satisfies the following formula $$|\theta_{FoV+}| < \frac{1}{2} \times \min_{\theta_{ele}} \left| \sin^{-1}\left(\frac{-1}{N_{ant} \cdot n} + \sin\theta_{ele}\right) - \theta_{ele} \right| \qquad \text{[Math. 13]}$$

-continued $$|\theta_{FoV-}| < \begin{cases} \frac{1}{2} \times \min_{\theta_{ele}}\left|\sin^{-1}\left(\dfrac{-1}{N_{ant}\cdot n} + \sin\theta_{ele}\right) - \theta_{ele}\right|, \text{ if} \\ \qquad \frac{1}{2} \times \min_{\theta_{ele}}\left|\sin^{-1}\left(\dfrac{-1}{N_{ant}\cdot n} + \sin\theta_{ele}\right) - \theta_{ele}\right| < \sin^{-1}\left(\dfrac{t}{r}\right) + \theta_{err} \\ \sin^{-1}\left(\dfrac{l}{r}\right) + \theta_{err}, \text{ if } \frac{1}{2} \times \min_{\theta_{ele}}\left|\sin^{-1}\left(\dfrac{-1}{N_{ant}\cdot n} + \sin\theta_{ele}\right) - \theta_{ele}\right| \geq \sin^{-1}\left(\dfrac{t}{r}\right) + \theta_{err} \end{cases}$$

$\theta_{FoV+}$ being a vertical angle threshold value above a mounting center line of a speed detection apparatus in the vertical direction, $\theta_{FoV-}$ being a vertical angle threshold value below the mounting center line of the speed detection apparatus in the vertical direction, $\theta_{ele}$ being a vertical angle value, $N_{ant}$ being the number of the plurality of transmission antennas that transmits the plurality of chirp signals to be used for vertical arrival angle estimation, n being a ratio between an interval between the plurality of transmission antennas in the vertical direction and a wavelength in free space of the chirp signal transmitted by the transmission antenna array, t being a mounting height of the speed detection apparatus in the vertical direction, r being a detection distance of the speed detection apparatus, $\theta_{err}$ being a mounting angle error of the speed detection apparatus.

10. The speed detection apparatus according to claim 1, further comprising a chirp control unit that controls the plurality of chirp signals transmitted from the plurality of transmission antennas such that when the plurality of chirp signals multiplexed between the plurality of transmission antennas is separated for each of the plurality of transmission antennas, intervals between the plurality of chirp signals from the same transmission antenna are equal and a plurality of intervals between the plurality of chirp signals from different transmission antennas are substantially equal.

11. The speed detection apparatus according to claim 1, wherein the chirp control unit multiplexes the plurality of chirp signals between the plurality of transmission antennas in time division.

12. The speed detection apparatus according to claim 1, wherein the chirp control unit multiplexes the plurality of chirp signals between the plurality of transmission antennas in phase division.

13. The speed detection apparatus according to claim 1, wherein one speed is determined from the plurality of speed candidates, the number of the plurality of speed candidates being equal to or less than the number of the plurality of transmission antennas that transmits the plurality of chirp signals to be used for vertical arrival angle estimation.

14. The speed detection apparatus according to claim 1, wherein the transmission antenna array and the reception antenna array constitute a vertical MIMO array with substantially equal intervals.

15. The speed detection apparatus according to claim 1, wherein the speed determination unit performs arrival angle estimation by fast Fourier transform (FFT) or discrete Fourier transform (DFT).

16. The speed detection apparatus according to claim 1, wherein the speed determination unit performs arrival angle estimation by CAPON, MUSIC, ESPRIT, or compression sensing.

17. An information processing device, comprising:

a speed determination unit that calculates a plurality of speed candidates on a basis of a plurality of chirp signals received by a reception antenna array of a speed detection apparatus including a transmission antenna array and the reception antenna array, the transmission antenna array transmitting a plurality of chirp signals multiplexed between a plurality of transmission antennas arranged in a vertical direction, the reception antenna array including a plurality of reception antennas receiving the plurality of chirp signals that has been reflected, and determines whether or not a plurality of vertical arrival angle estimation values corresponding to the plurality of speed candidates falls within a vertical angle threshold range, and determines, as a true speed, one speed candidate from the plurality of speed candidates on a basis of a determination result.

18. An information processing method, comprising:

in a speed detection apparatus including a transmission antenna array that transmits a plurality of chirp signals multiplexed between a plurality of transmission antennas arranged in a vertical direction, and a reception antenna array that includes a plurality of reception antennas receiving the plurality of chirp signals that has been reflected, calculating a plurality of speed candidates on a basis of the plurality of chirp signals received by the reception antenna array; and determining whether or not a plurality of vertical arrival angle estimation values corresponding to the plurality of speed candidates falls within a vertical angle threshold range, and determining, as a true speed, one speed candidate from the plurality of speed candidates on a basis of a determination result.

* * * * *